(12) United States Patent
Bakaraju et al.

(10) Patent No.: US 12,498,588 B2
(45) Date of Patent: Dec. 16, 2025

(54) OPTICAL FILMS WITH NON-REFRACTIVE OPAQUE FEATURES TO TRANSFORM SINGLE VISION OPHTHALMIC LENSES INTO MYOPIA MANAGEMENT OPHTHALMIC LENSES

(71) Applicant: Nthalmic Holding Pty Ltd, Sydney (AU)

(72) Inventors: Ravi Chandra Bakaraju, Sydney (AU); Klaus Ehrmann, Sydney (AU); Darrin Falk, Sydney (AU)

(73) Assignee: Nthalmic Holding Pty Ltd, Sydney (AU)

( * ) Notice: Subject to any disclaimer, the term of this patent is extended or adjusted under 35 U.S.C. 154(b) by 495 days.

(21) Appl. No.: 17/802,529

(22) PCT Filed: Feb. 22, 2021

(86) PCT No.: PCT/AU2021/050149
§ 371 (c)(1),
(2) Date: Aug. 26, 2022

(87) PCT Pub. No.: WO2021/174290
PCT Pub. Date: Sep. 10, 2021

(65) Prior Publication Data
US 2023/0176399 A1  Jun. 8, 2023

(30) Foreign Application Priority Data

Mar. 1, 2020 (AU) ................................ 2020900604
Mar. 1, 2020 (AU) ................................ 2020900605

(51) Int. Cl.
*G02C 7/02* (2006.01)

(52) U.S. Cl.
CPC ............. *G02C 7/021* (2013.01); *G02C 7/028* (2013.01); *G02C 2202/24* (2013.01)

(58) Field of Classification Search
CPC .... G02C 7/021; G02C 7/028; G02C 2202/24; G02C 9/00
(Continued)

(56) References Cited

U.S. PATENT DOCUMENTS 4,958,922 A  9/1990  Binh et al.
5,777,717 A  7/1998  Martin et al.
(Continued)

FOREIGN PATENT DOCUMENTS

CN  201666986  12/2010
CN  206532048  9/2017
(Continued)

OTHER PUBLICATIONS

"Search Report of Europe Counterpart Application", issued on Mar. 27, 2024, p. 1-p. 11.
(Continued)

*Primary Examiner* — Tuyen Tra
(74) *Attorney, Agent, or Firm* — JCIPRNET

(57) ABSTRACT

The present disclosure relates to means of managing eye-length disorders, like myopia. The invention includes an apparatus and methods for the prescription, selection, supply and fitting of permanent or impermanent optical films used in conjunction with standard single vision spectacles, wherein the apparatus and methods are configured with non-refractive opaque features, wherein the non-refractive opaque features facilitate an active rise in the overall retinal ganglion cell activity for the wearer, which may serve as an optical signal to decelerate, ameliorate, control, inhibit, or reduce the rate of myopia progression of the wearer.

18 Claims, 29 Drawing Sheets

(58) Field of Classification Search
USPC .............................. 351/41, 159.01, 159.69
See application file for complete search history.

(56) References Cited

U.S. PATENT DOCUMENTS

| | | | |
|---|---|---|---|
| 5,867,247 | A | 2/1999 | Martin et al. |
| 9,715,129 | B2 | 7/2017 | Bowers et al. |
| 9,848,979 | B2 | 12/2017 | Vilupuru et al. |
| 2013/0093994 | A1 | 4/2013 | Ando et al. |
| 2018/0095296 | A1 | 4/2018 | Lin et al. |
| 2018/0373059 | A1 | 12/2018 | Lin et al. |
| 2019/0235279 | A1 | 8/2019 | Hones et al. |

FOREIGN PATENT DOCUMENTS

| | | |
|---|---|---|
| RU | 176857 | 1/2018 |
| WO | 0184219 | 11/2001 |
| WO | 2018076057 | 5/2018 |
| WO | 2019189763 | 10/2019 |
| WO | 2019206569 | 10/2019 |

OTHER PUBLICATIONS

"International Search Report (Form PCT/ISA/210) of PCT/AU2021/050149", mailed on May 24, 2021, pp. 1-6.

"Office Action of Taiwan Counterpart Application", issued on Jan. 3, 2025, with English translation thereof, pp. 1-27.

"Office Action of China Counterpart Application", issued on Jan. 23, 2025, with English translation thereof, pp. 1-17.

"Office Action of Taiwan Counterpart Application", issued on Jul. 15, 2025, with English translation thereof, p. 1-p. 8.

"Office Action of Korea Counterpart Application", issued on Jul. 19, 2025, with English translation thereof, p. 1-p. 17.

"Office Action of Europe Counterpart Application", issued on Oct. 30, 2025, p. 1-p. 6.

OPTICAL FILMS WITH NON-REFRACTIVE OPAQUE FEATURES TO TRANSFORM SINGLE VISION OPHTHALMIC LENSES INTO MYOPIA MANAGEMENT OPHTHALMIC LENSES

CROSS-REFERENCE

This application is a 371 of international application of PCT application serial no. PCT/AU2021/050149, filed on Feb. 22, 2021, which claims priority to Australian Provisional Application Serial No. 2020/900604 filed on Mar. 1, 2020 entitled "A Single Vision Lens", and 2020/900605 filed on Mar. 1, 2020, entitled "A Lens for Myopia"; both of which are herein incorporated by reference in their entirety.

FIELD OF THE INVENTION

The disclosure relates to means of managing myopia. The disclosure relates to apparatus and methods for the prescription, selection, supply, and fitting of optical films used in conjunction with standard single vision spectacle lenses used for correcting the refractive error of a myopic individual, wherein the optical films are configured with non-refractive opaque features to facilitate an increase in the retinal ganglion cell activity to serve as an optical signal to decelerate, ameliorate, control, inhibit, or reduce the rate of myopia progression of the wearer.

BACKGROUND

The human retina has three primary layers: the photoreceptor layer, the outer plexiform layer, and the inner plexiform layer. Cones and rods are the photoreceptors that respond to light in the retina of a human eye by transforming incoming light into electrical signals. The transduced electrical signal propagates from the photoreceptors, through the bipolar cells, further to the retinal ganglion cells and the optic nerve, carrying visual information from the retinal cells to the brain allowing visual perception of the world.

The photoreceptors respond with graded membrane potentials and release neurotransmitter glutamate proportional to the level of their polarisation state. For example, in absence of a light stimulus, the photoreceptors depolarise and release more glutamate relative to its baseline state.

In the presence of light, the photoreceptors hyperpolarise, which happens due to the breakdown of opsins in the photoreceptors, causing it to release less glutamate relative to its baseline state. There are two types of bipolar cells in the retina, on- and off-centre bipolar cells, which separately encode positive and negative spatiotemporal contrast from incoming light by comparing the photoreceptor signals to spatiotemporal averages computed by the laterally connected layer of horizontal cells. The horizontal cells are interconnected by conductive gap junctions and are connected to bipolar cells and photoreceptors in a complex triad synapse. The on- and off-centre bipolar cells have different responses to glutamate, which are based on the type and number of glutamate receptors located on each of these bipolar cells. The off-centre bipolar cells have ionotropic receptors, which are excitatory to glutamate. These off-centre bipolar cells depolarise in response to glutamate and preserve the sign of the photoreceptors' signal. In presence of light, off-centre bipolar cells receive less glutamate from the photoreceptors, causing hyperpolarisation and release less glutamate to the corresponding ganglion cells downstream. In absence of light, the off-centre bipolar cells receive more glutamate from the photoreceptors, causing depolarisation and release more glutamate to the corresponding ganglion cells downstream. The on-centre bipolar cells have metabotropic receptors, which are inhibitory to glutamate. These on-centre bipolar cells hyperpolarise in response to glutamate and reverse the sign of the photoreceptors' signal. In the presence of light, the on-centre bipolar cells receive less glutamate from the photoreceptors, causing depolarisation and release more glutamate to the corresponding ganglion cells downstream. In the absence of light, the on-centre bipolar cells receive more glutamate from the photoreceptors, causing hyperpolarisation and release less glutamate to the corresponding ganglion cells downstream. The more glutamate the on- or off-centre bipolar cells release onto the corresponding ganglion cells downstream, the greater is the action firing potential of the ganglion cells. The opposite responses to light between the on-centre bipolar and off-centre bipolar cells are the key to the differential response to light and dark states. In addition, the depolarising signal activity of the on- and off-centre bipolar cells may be amplified or suppressed by the horizontal cells that connect the surrounding photoreceptors in the corresponding receptive fields. The horizontal cells receive excitatory input from the photoreceptors and send out inhibitory feedback in return to the photoreceptors connected in the surrounding neighbourhood.

Receptive fields are groups of photoreceptors that send inputs downstream to bipolar and ganglion cells in the retina. The retinal receptive field can be described using concentric circular zones with a small circular central field and a broader circular field around the central field called the surround field. The receptive fields fall into two categories, namely, the off-centre with on-surround type receptive field and the on-centre with off-surround type receptive field. On- and off-centre receptive fields have different responses to light based on differences in bipolar cells.

Human eyes are hyperopic at birth, where the length of the eyeball is too short for the total optical power of the eye. As the person ages from childhood to adulthood, the eyeball continues to grow until the eye's refractive state stabilises. The growth of the eye is understood to be controlled by a feedback mechanism and regulated predominantly by the visual experience, to match the eye's optics with the eye length and maintain homeostasis. This process is referred to as emmetropisation. The signals that guide the emmetropisation process are initiated by the modulation of light energy received by the retina. The retinal image characteristics are monitored by a biological process that modulates the signal to start or stop, accelerate, or slow eye growth. This process coordinates between the optics and the eyeball length to achieve or maintain emmetropia. Derailing from this emmetropisation process results in refractive disorders like myopia. It is hypothesised that diminished retinal activity encourages eye growth, and contrarily increase in retinal activity inhibits eye growth.

The prevalence of myopia is increasing at alarming rates in many regions of the world, particularly in East Asia. In myopic individuals, the axial length of the eye is mismatched to the overall power of the eye, leading to distant objects being focused in front of the retina. A simple pair of negative single vision spectacle lenses can correct myopia. While such devices can optically correct the refractive error associated with eye length, they do not address the underlying cause of the excessive eye growth in myopia progression. Excessive eye length in high degrees of myopia is associated with significant vision threatening conditions like cataract, glaucoma, myopic maculopathy, and retinal detachment. Thus, there remains a need for specific optical devices for such individuals, that not only correct the underlying refractive error, but also prevent excessive eye lengthening or progression of myopia.

Definitions

Terms, as used herein, are generally used by a person skilled in the art unless otherwise defined in the following: The term "myopic eye" means an eye that is either already experiencing myopia, is in the stage of pre-myopia, is at risk of becoming myopic, or is diagnosed to have a refractive condition that is progressing towards myopia with or without astigmatism.

The term "progressing myopic eye" means an eye with established myopia that is diagnosed to be progressing, as gauged by either the change in refractive error of at least −0.25 D/year or the change in axial length of at least 0.1 mm/year. The term "pre myopic" or "an eye at risk of becoming myopic" means an eye, which could be emmetropic or is low hyperopic at the time but has been identified to have an increased risk of becoming myopic based on genetic factors (e.g., both parents are myopic) and/or age (e.g., being low hyperopic at a young age) and/or environmental factors (e.g., time spent outdoors) and/or behavioural factors (e.g., time spent performing near tasks).

The term "optical stop signal" or "stop signal" means an optical signal or directional cue that may facilitate slowing, reversing, arresting, retarding, inhibiting, or controlling the growth of an eye and/or refractive condition of the eye.

The term "spectacle lens" may mean a finished or semi-finished blank lens. The term "standard single vision spectacle lens" or "commercially available single vision spectacles" "standard spectacles" or "habitual single vision" means spectacle lenses used to correct the underlying refractive error of the eye; wherein the refractive error may be myopia, with or without astigmatism.

The term "myopia management spectacle lens" or "myopia management spectacles" means spectacle lenses used to not only correct the underlying refractive error of the eye but also manage the progression of refractive error; wherein the refractive error may be myopia, with or without astigmatism.

The term "optical zone" or "optic zone" means the region on the spectacle lens or spectacle front which has the prescribed optical effect. The term "optical centre" means the geometric centre of the optical zone of the spectacle lens.

The term "optical axis" means line passing through the optical centre and substantially perpendicular to the plane containing the edge of the spectacle lens.

The term or phrase "single vision optical zone" or "substantially single vision optics" or "substantially single vision profile" or "spherical optical zone" means that the optical zone has a uniform power distribution without substantial amounts of primary spherical aberration. The single vision optical zone may be further classified to include astigmatic component to correct the distance refractive error. The term "model eye" may mean a schematic, raytracing, or a physical model eye.

The terms "Diopter", "Dioptre" or "D" as used herein is the unit measure of dioptric power, defined as the reciprocal of the focal distance of a lens or an optical system, in meters, along an optical axis. The term "D" signifies spherical dioptric power, and term "DC" signifies cylindrical dioptric power.

The terms "base prescription for correcting the refractive error" means the standard spectacle prescription required to correct underlying myopia in an individual, with or without astigmatism.

The term "sub-foveal region" means the region immediately adjacent to the foveal pit of the retina, approximately a region of 0.5 mm diameter. The term "foveal region" means approximately a region of 1.5 mm diameter about the foveal pit. The term "parafoveal region" means the region adjacent to the foveal region, approximately outside the 1.5 mm and within 3 mm diameter about the foveal pit. The term "para macular region" means the region the region immediately adjacent to the foveal region, approximately outside the 1.5 mm and within 3 mm diameter about the foveal pit.

SUMMARY OF THE INVENTION

The detailed discussion on the prior art, and the subject matter of interest in general, is provided as the background of the present disclosure, to illustrate the context of the disclosed embodiments, and furthermore, to distinguish the advances contemplated by the present disclosure over the prior art. No material presented here should be taken as an acknowledgment that the material mentioned is previously disclosed, known, or part of common general knowledge, on the priority of the various embodiments and/or claims set forth in the present disclosure.

Briefly summarised, all prior art optical designs with refractive or phase-altering features used for managing myopic refractive error involve significant visual compromises, which are primarily precipitated due to the use of multifocal-like design features often considered in the field. Examples are described in U.S. Pat. Nos. 6,045,578, 7,025,460, 7,506,983, 7,401,922, 7,803,153, 8,690,319, 8,931,897, 8,950,860, 8,998,408.

A catalogue of solutions has been proposed in the optical field with amplitude altering features to improve depth of focus for general imaging systems. Examples are described in the papers written by Mino and Okano, Applied Optics 1971, entitled "Improvement in the OTF of a defocused optical system through the use of shaded apertures"; Castaneda et al., Applied Optics 1989, entitled "Arbitrary high focal depth with a quasi-optimum real and positive transmittance apodizer"; Castaneda and Berriel-Valdos, published in Applied Optics 1990, entitled "Zone plate for arbitrary high focal depth"; and U.S. Pat. No. 5,965,330A, 857065562 and 8192022. The disadvantages with amplitude altering solutions include reduced energy transmission at critical frequencies, poorer resolution relative to their phase-altering counterparts, and low light throughput. On the contrary, the present disclosure is directed to the use of standard single vision spectacle lenses purposefully configured with non-refractive opaque features which are aimed to provide an increase in retinal ganglion cell activity and to overcome one or more of the drawbacks of the prior art, as described herein.

Certain disclosed embodiments are directed towards apparatus, supply and configuration of an optical film or sheet used in conjunction with standard single vision spectacle lens, and methods of use of the optical film or sheet in conjunction with standard single vision spectacle lens for correcting and managing myopia. Certain disclosed embodiments are aimed at both, to correct the myopic refractive error and simultaneously provide an increase in retinal ganglion cell activity serving as an optical stop signal to reduce the progression of eye growth of the wearer. Certain disclosed embodiments include spectacle lenses for altering the properties of incoming light entering a human eye. Certain disclosed embodiments are directed to the configuration of spectacle lenses for correcting, managing, and treating refractive errors, for example myopia. Some embodiments are aimed to both correct the myopic refractive error and simultaneously provide an optical stop signal that discourages further eye growth or progression of myopia.

Certain other disclosed embodiments are directed to the ongoing need for enhanced spectacle designs that may inhibit the progression of myopia while providing reasonable and adequate visual performance to the wearer for a range of activities that the wearer may undertake as a daily routine. Various aspects of the embodiments of the present invention disclosure address such needs of a wearer.

Certain disclosed embodiments include an optical film or sheet to be used in conjunction with standard single vision spectacle lenses, wherein the optical film or sheet is purposefully configured with non-refractive opaque features, and wherein the configured optical film or sheet used in conjunction with a standard single vision spectacle lens, results at least in part, in a foveal correction of the myopic eye and, at least in part, results in an increase in the retinal ganglion cell activity of the myopic eye that inhibits further eye growth or progression of myopia for the wearer. The present disclosure relates to spectacles for managing eye-length disorders, like myopia. The proposed methods include correcting the myopic refractive error and controlling, inhibiting, or reducing the rate of myopia progression. The present disclosure relates to optical interventions that utilise the effects of increased retinal ganglion cell activity to reduce myopia progression. In some embodiments, the region or regions of the retina imposed with an increased retinal activity may be imposed at the fovea, parafoveal, macular and/or the paramacular region of the retina. In some embodiments, the region or regions of the retina imposed with an increased retinal activity may be in the temporal, nasal, inferior, and/or superior portion of the retina.

Certain embodiments of the present disclosure are directed towards methods including procedures for the prescription, selection, fitting and supply of an optical film or sheet to be used in conjunction with a standard single vision spectacle lens, configured to provide an increased retinal ganglion cell activity, i.e., a stop signal, to decelerate the rate of myopia progression. Certain embodiments of the disclosure are directed towards an apparatus and methods, including an optical film for converting a standard single vision spectacle lens for correction of myopia to a myopia management spectacle lens for both the correction of myopia and retarding, decelerating, reducing and/or managing the progression of myopia; wherein the optical film may be configured on the standard single vision spectacle lens using desired non-refractive opaque features across the optical film.

In some embodiments, the non-refractive opaque features of the optical film may be different in different regions of the optical film, such that when the optical film is configured on or adhered to the single vision spectacle lens, it provides an increase in retinal ganglion cell activity for at least one specific region of the retina of the wearer to reduce the rate of myopia progression. The desired non-refractive opaque features in an optical film may be configured by of the optical film. In some examples, the optical film is configured such that the non-refractive opaque features are centred with respect to the optical centre of the standard single vision spectacles. In such instance, if the shape of the optical film is matches the spectacle frame then it is also centred with respect to the geometrical centre of the optical film.

In some examples, the specific region or regions of the retina for introducing an increased retinal ganglion cell activity blur may be in the nasal, temporal, superior, and/or inferior portion of the retina. In some other examples, other retina locations may be identified. In some other embodiments, the one or more specific region or regions of the retina of the wearer for introducing an increased retinal cell activity may be in the sub-foveal, foveal, parafoveal, macular, and/or paramacular region of the retina.

In some other embodiments, the one or more specific region or regions of the retina of the wearer for introducing an increased retinal ganglion cell activity may be at least within 2.5 degrees, 5 degrees, 10 degrees, 15 degrees, 20 degrees, or 25 degrees of the visual field. The specific region or regions of the retina may be different between the left and right eyes of the wearer. In some examples, the differences may be configured as differences in size, orientation and/or location of the optical stimulus. In other examples, the differences may be chosen such that at least one eye would maintain adequate visual performance comparable to that of a standard single vision lens at any given angle.

In some embodiments, the contemplated optical film or sheet may cover the entire standard single vision spectacle lens; while in other embodiments, the optical film embodiment may only be configured in a specific region on the spectacle lens. Certain examples may include an optical film or sheet configured to provide the wearer with the desired increased retinal ganglion cell activity that is configured in elliptical shape, circular shape, or an irregular shape.

In some embodiments of the disclosure, the optical film or sheets to be used in conjunction with standard single vision spectacle lens, configured with desired non-refractive opaque features, may be either glued onto the standard single vision spectacle lens, or is made to adhere with finger pressure to the standard single spectacle lens, or may be used as a sticker on one of the surfaces of the standard single vision spectacle lens, or may be used as a peel-able adhesive on one of the surfaces of the standard single vision spectacle lens, or a combination thereof. In some other examples, the prescribed method providing a manner of use may include identification of certain specific locations on the base spectacle lens and marking these locations with tiny embossing or miniature engravings within the matrix of the standard single vision spectacle lens.

In some embodiments of the disclosure, the optical film or sheet with the desired non-refractive opaque features may be configured using a clear, elastic, thin, conformable material and may be implemented as a sticker on a standard single vision spectacle lens aimed to correct refractive errors, for example, myopia with or without astigmatism.

In some embodiments of the disclosure, the optical film or sheet configured with the non-refractive opaque features, configured as one or more stickers on the standard single vision spectacle lens aimed to correct myopia may cover only a regional portion of the spectacle lens. In some examples, the regional portion of the spectacle lens covered by the said sticker may have a surface area of at least 3 $mm^2$, at least 4 $mm^2$, at least 5 $mm^2$, at least 6 $mm^2$, at least 7 $mm^2$, at least 8 $mm^2$ or at least 10 $mm^2$.

Certain embodiments relate to an apparatus, device, and/or a method capable of modifying incident light through an optical film or sheet used in conjunction with a standard single vision spectacle lens to provide an active rise in retinal ganglion cell activity for slowing eye growth in an individual. This may be accomplished through the configuration of certain non-refractive opaque features within the optical film or sheet, used in conjunction with single vision spectacle lenses, that are aimed at introduction of artificial edge pattern, or artificial luminous contrast profiles, imposed onto the central and/or peripheral retina. The active rise in retinal encoding of spatio-temporal signal is postulated to discourage further eye growth.

The artificial edge patterns, or artificial luminous contrast profiles, imposed on the retina, offer a spatial contrast profile across the on- and off-centre retinal fields across the retina. The artificially induced edges provide an increase in the retinal spiking activity, or ganglion cell firing activity, which is a surrogate measure of overall retinal activity. The current disclosure postulates that increased retinal ganglion cell activity may in turn provide an optical stop signal to a progressing myopic eye. In some other embodiments of the present disclosure, the optical film or sheet with the non-refractive opaque features is configured such that the artificial edge patterns, or artificial spatial luminous contrast profiles, imposed on the retina are further configured to offer a temporal variation in the overall retinal ganglion cell activity.

Certain embodiments of the present disclosure involve one or more variations of the structural characteristics of the non-refractive opaque features configured within the optical film or sheet, used in conjunction with single vision spectacle lenses, as disclosed herein. For example, the structural characteristics of the non-refractive opaque features include one or more of the following: their opaqueness, their size, width, and shape, their method of application, their location of application, their distribution, their arrangement pattern and spanning area, within the optical film or sheet. The contemplated variations of the numerous structural characteristics of the non-refractive opaque features provide a desired on-eye functional visual performance, while maintaining the potency of the spectacle lens embodiments to slow the progression of myopia, as disclosed herein.

Certain embodiments of the present disclosure involve optimisation of the non-refractive opaque features, including but not limited to, the following features: opaqueness, size, shape, plurality, pattern, location, and method of application, to provide a desired level of increase and/or a desired level of temporal variance in retinal ganglion cell activity without compromising the eye's resolution capabilities. For example, in some embodiments of the present disclosure, the one or more characteristics of the non-refractive opaque features within optical film or sheet used in conjunction with an otherwise standard single vision spectacle lens with a base prescription to correct the refractive error of the eye, wherein the embodiment spectacle lens when tested on a model eye, presented with a number of common visual scenes that may include scenes typical of environments and or behaviours thought to be associated with myopia development and/or progression, provides an increase in the retinal ganglion cell activity by about at least 1.25 times, at least 1.5 times, at least 1.75 times, at least 2 times, at least 2.5 times or at least 3 times the retinal ganglion cell activity of a standard single vision spectacle lens without the optical film or sheet configured with non-refractive opaque features; wherein the retinal ganglion cell activity may include on-type cells, off-type cells or both on-type and off-type cells within the receptive fields. In some examples, the retinal ganglion cell activity may be within a local region, a plurality of local regions, or averaged across the desired retinal field.

In some other embodiments, the spectacle lens with the optical film or sheet configured with non-refractive opaque features when tested on a model eye additionally provides a temporal variation in the retinal ganglion cell activity. In some examples, the retinal ganglion cell activity may be gauged by the retinal spike train analysis, while in some other examples, it may be gauged by the average retinal spike rate as a function of time. In certain other embodiments of the disclosure, the embodiment spectacle lens with the optical film or sheet configured with non-refractive opaque features when tested on a model eye provides increased temporal variations, or fluctuations or oscillations to the retinal ganglion cell activity; wherein the temporal variations of the retinal ganglion cell activity may be represented as one or more of the following: non-monotonic fluctuations, quasi-sinusoidal variations, sinusoidal variations, periodic variations, aperiodic variations, aperiodic quasi-rectangular variations, rectangular variations, square-wave variations, or random variations in the retinal ganglion cell activity.

In some examples, specific types of visual stimuli may be used to elicit the retinal ganglion cell activity, for example, white-noise electrical stimulation, a sinusoidal variation in the visual stimuli, a checkerboard pattern, full-field flash stimuli, semi-field flash stimuli, full-field Gaussian noise, semi-field Gaussian noise, regional flash stimuli, regional Gaussian noise, etc. In some examples only coarse characterisation of neural response to the stimuli may be desirable; while in other examples, much finer characterisation of neural response to stimuli may be desirable. The stimuli used in this disclosure are considered only a representative means to demonstrate the workings of the disclosure and the choice of should not be construed as limiting the scope of the disclosure and/or the claims.

In some embodiments of the present disclosure, the opaqueness of the non-refractive opaque features configured on or within the optical film or sheet may be configured such that the feature absorbs at least 80%, at least 85%, at least 90%, at least 95%, at least 98%, at least 99%, or all of 100%, of light incident on the non-refractive opaque feature. In some other embodiments of the present disclosure, the opaqueness of the non-refractive opaque features on or within the optical film or sheet may be configured such that the feature absorbs between 80% to 90%, or between 80% to 95%, or between 80% to 99% of light incident on the non-refractive opaque feature.

In some examples, the magnitude and intensity of the light entering and exiting one or more of the optical film embodiments of the present disclosure may be captured using a dedicated instrument. The level of absorption, or magnitude of absorbance of the incident light, by the non-refractive opaque features configured within the embodiments of this disclosure may be ascertained by calculating the difference between the light exiting and entering the spectacle lens. In some embodiments of the present disclosure, the width of any one or more of the non-refractive opaque features may be configured such that the feature is at least 3, at least 4, at least 5, at least 6, at least 7, at least 8, at least 9, or at least 10 times of the average wavelength of light in the visible spectrum (i.e., 555 nm).

In some other embodiments of the present disclosure, the width of the non-refractive opaque feature may be configured such that the feature is between 3 and 5 times, or between 4 and 7 times, or between 5 and 9 times, or between 3 and 10 times, of the average wavelength of light in the visible spectrum (i.e., 555 nm). The lower limit on the choice of the width of the non-refractive opaque features to be substantially greater than the average wavelength of light in the visible spectrum is underpinned by the desirable outcome to avoid unwarranted diffractive effects about the edges of the non-refractive opaque features disclosed herein. In some embodiments, the width of any one or more of the non-refractive opaque features on an ophthalmic lens may be configured such that the feature is no greater than 50 µm, or no greater than 75 µm, or no greater than 100 µm, or no greater than 150 µm, or no greater than 200 µm, or no greater than 250 µm, or no greater than 300 µm. The upper limit on the choice of the width/size of the non-refractive opaque features is underpinned by the desirable outcome of maintaining an adequate amount of light entering the eye that allows for minimal energy loss and thereby allowing for substantially no change in the resolution capability for the eye wearing the contemplated embodiments disclosed herein.

In some other embodiments of the disclosure, the non-refractive opaque features may be customised based on the degree of myopia and the rate of progression such that the potency of the reduction in rate of progression may be balanced with the desired degree of compromise in visual performance that may be accepted by the wearer. In certain embodiments of the present disclosure, the shape of any one or more of the non-refractive opaque features that may be configured on or within the optical film or sheet may be configured such that the feature is circular, hexagonal, octagonal, regular polygon, irregular polygon, line, triangle, dot-like, arc-like or any other random shapes disclosed herein.

In some other embodiments, the contemplated design features of non-refractive opaque features may form different shaped apertures. In some other embodiments, the multiple apertures may be referred to as multiple regions, or zones. The said multiple apertures, regions, or zones may be configured circular, non-circular, semi-circular, annular, oval, rectangular, octagonal, hexagonal, or square in shape. In certain embodiments of the present disclosure, the arrangement of the non-refractive opaque features on or within the optical film or sheet to be used in conjunction with a standard single vision spectacle lens may be configured such that the area spanned by all of the non-refractive opaque features is within the 20 mm, or within the 25 mm, or within the 30 mm, or within the 35 mm, or within the 40 mm, or within the 45 mm, or within the 50 mm, or within the 60 mm central diameter of the optic zone of the single vision spectacle lens.

In some other examples of the present disclosure, the non-refractive opaque features within the optical film or sheet to be used in conjunction with a standard single vision spectacle lens may be implemented within the central 30%, 35%, 40% 45%, 50%, 55%, or 60%, area of the optical zone of the single vision spectacle lens. In some other examples of the present disclosure, the non-refractive opaque features on or within the optical film or sheet to be used in conjunction with a standard single vision spectacle lens may be implemented within the peripheral 10%, 15%, 20% 25%, 30%, 35%, or 40% area of the optical zone of the single vision spectacle lens. The references to central or peripheral portions of the single vision spectacle lens is made from the optical centre of the spectacle lens.

In some other examples of the present disclosure, the non-refractive opaque features may be implemented on one or more of the following locations: the front surface of the optical film, the back surface of the optical film, and/or within the matrix of the optical film or sheet. In some embodiments, the method of implementation of the non-refractive opaque features on the optical film may be achieved via pad-printing or laser printing approaches as used in the routine development of cosmetic lenses. In some other examples of the present disclosure, the optical film or sheet may be implemented on one or more following locations: the front surface of the standard single vision spectacle lens and/or the back surface of the standard single vision spectacle lens. In some embodiments of the present disclosure, the implemented non-refractive opaque features may be arranged in form of multiple apertures, multiple zones, multiple regions, that may facilitate an increase in retinal ganglion cell activity serving as an optical stop signal for inhibiting, reducing, or controlling progressive myopic refractive error, as disclosed herein. In other embodiments, the non-refractive opaque features may be implemented via homogeneous media or heterogeneous media configured into the matrix of the optical film. In some other embodiments, the implementation may involve photo-etching of a media on the surface or within the matrix, or other photographic process. The present disclosure relates to an optical film configured with non-refractive opaque features which alters the transmitted properties of the incoming light, creating distinct luminous contrast profiles (i.e., artificial edges) on the retina of the wearer. The alteration of the transmission properties of the eye is achieved, by employing a plurality of relatively lower transmission lines or striae, or alternatively, by employing non-refractive opaque features arranged as multiple apertures, zones, regions, or other patterns contemplated herein. The low transmission lines or striae or features may be configured on one or more of the locations on the optical film: front surface of the optical film, back surface of the optical film, or may be embedded within the matrix of the optical film. The low transmission lines, striae or features may be configured to be opaque, translucent, reflective, or absorbent. The dimensional specifications of the low transmission features, for example, width and length of the non-refractive opaque features can be adjusted in the optical film design as desired, to increase the amount of light entering the eye, minimise visual artefacts while adequately configuring the optical film to be used in conjunction with a standard single vision spectacle lens for the desired refractive correction of the wearer's eye and maintaining, or providing, an adequate stop signal to the wearer's eye.

The current disclosure proposes use of non-refractive opaque features to retard the progression of myopia. The use of non-refractive opaque features facilitates embodiments that do not utilise any of the phase-altering approaches of positive defocus, positive spherical aberration, or any other variants, for example, bifocal, multifocal or extended depth of focus optical features. The current disclosure proposes a method to retard the progression of myopia by introducing artificial edges, or luminous contrast profiles, into the retinal imagery captured while viewing through the optical film or sheet used in conjunction with a standard single vision spectacle lens and providing an increase in the retinal ganglion cell activity which may inhibit further eye growth.

In some embodiments of the disclosure, incorporation of the non-refractive opaque features on or within the optical film or sheet to be used in conjunction with a standard single vision spectacle lens may lead to poor cosmetical appearance of the spectacle lens which may be undesirable for the wearer. Some embodiments of the disclosure provide a spatiotemporal variation of stop signal facilitated by the eye-movements while wearing the contemplated optical film or sheet in conjunction with a standard single vision spectacle lens as disclosed herein. The spatiotemporal variation of the presentation of the artificial edge profiles, or luminous contrast profiles, allow for minimisation of the saturation of efficacy with time on the rate of progression of myopia. The embodiments presented in this disclosure are directed to the ongoing need for enhanced ophthalmic lenses that offer a therapeutic benefit of inhibiting, or reducing the rate of progression of myopia, while providing single vision equivalent, or adequate, visual performance to the wearer across a range of distances and viewing angles. In accordance with some of the embodiments, an optical film or sheet is configured with a plurality of non-refractive design features, for example, a plurality of lines, or striae, or apertures or patterns, when used in conjunction with a standard single vision spectacle lens, provides an active rise in retinal encoding of a spatio-temporal signal facilitated by the eye-movements while wearing the contemplated optical film or sheet in conjunction with a standard single vision spectacle lens as disclosed herein. The embodiments presented in this disclosure are directed to the ongoing need for enhanced optical designs of ophthalmic lenses that may inhibit the progression of myopia while providing reasonable and adequate visual performance to the wearer for a range of activities that the wearer may undertake as a part of their daily routine.

Various aspects of the embodiments of the present disclosure address such needs of a wearer. An exemplary method of this disclosure includes the selection of the size, pattern and arrangement of the non-refractive opaque features contemplated on or within the optical film or sheet to be used in conjunction with the standard single vision spectacle lenses in the present disclosure such that the desirable increase in ganglion cell activity at the retina of the individual is balanced with any marginal perception of the visual disturbances that may be experienced by the individual. In one or more embodiments of the present disclosure, the non-refractive opaque features within the optical film, or sheet, are configured substantially opaque and are positioned within the designated region of the standard single vision spectacle lens; such that these non-refractive opaque features provide an increase in retinal ganglion cell activity in the on- and off-centre retinal pathways disclosed herein.

In some methods of this disclosure, the selection of the type of non-refractive opaque features and their location of application may depend on the activities that the wearer may undertaking while wearing the ophthalmic device, for example, a wearer that reads and performs activities on a computer or table or phone may be prescribed with a specific pattern, or a location on the spectacle lens, that is different to a wearer who is engaged in distance visual tasks such that the balance between the potency of the therapeutic benefit and visual performance is maintained at desirable levels. In some other methods, the selection of non-refractive opaque features may depend on the underlying risk factors for developing, or experiencing, progressive myopia.

Several other embodiments including the embodiments discussed in the summary are set forth in the description, the drawings, and the claims of the disclosure. Understandably, it is practically not possible to include every single combination of the contemplated embodiments of the disclosure, any combinations, or any variants, which contemplate, at least in part, the underlying concept of increasing retinal ganglion cell activity through the use of non-refractive opaque features on or within the optical film or sheet to be used in conjunction with the standard single vision spectacle lenses is considered to be in the scope of the invention. This summary section of the disclosure is not intended to be limited to the embodiments disclosed herein. Furthermore, any limitations of one embodiment may be combined with any other limitations of any other embodiment to constitute additional embodiments of the present disclosure.

DETAILED DESCRIPTION

Figure 1:
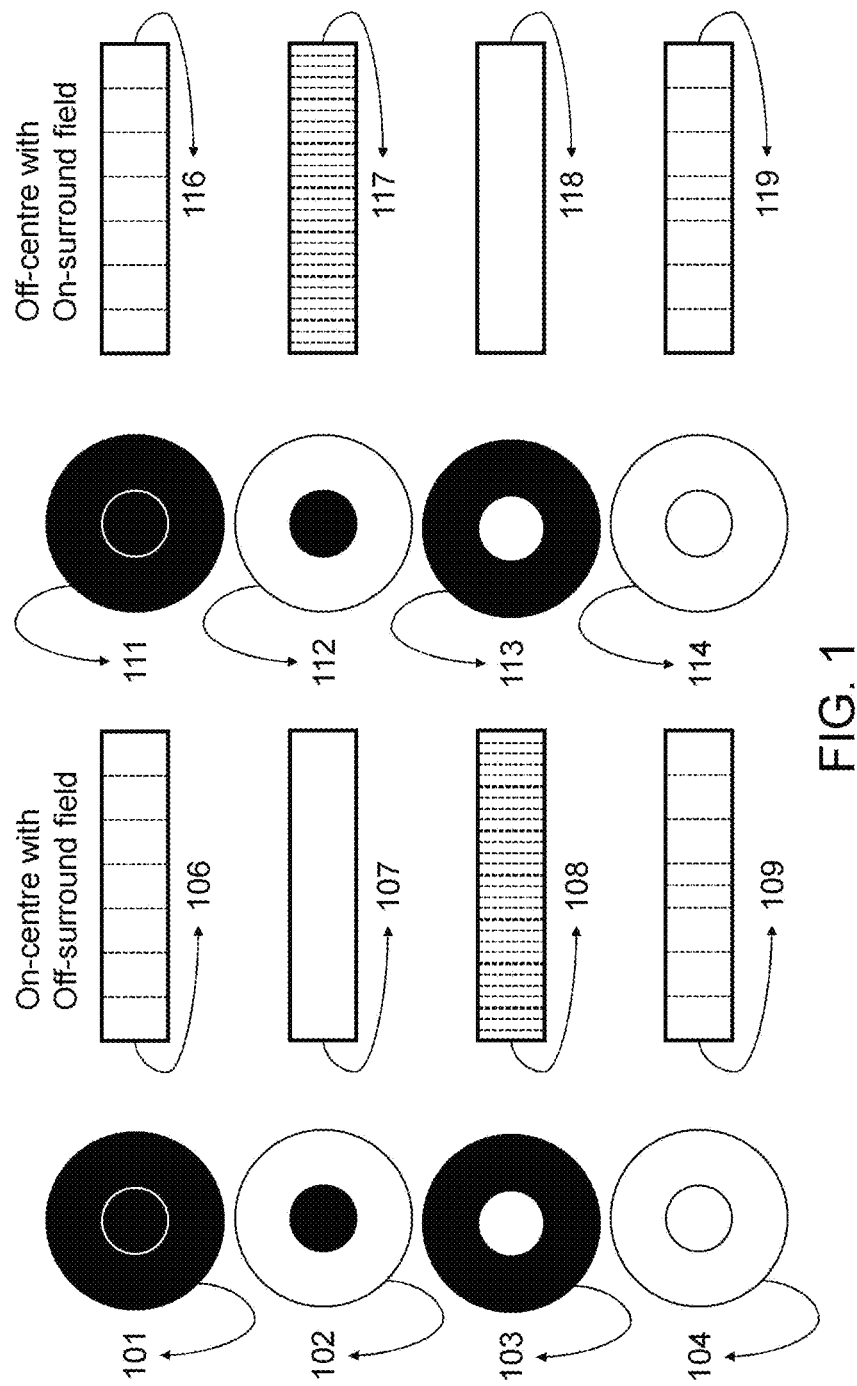
FIG. 1 illustrates the workings of the on-centre/off-surround and the off-centre/on-surround types of retinal receptive fields, according to certain embodiments.

Optical solutions available for retarding the rate of myopia progression include optical manipulation of the retinal image characteristics, for example, lenses that utilise simultaneous defocus, positive spherical aberration, or positive power in the centre and/or periphery of the optic zone. One of the weaknesses of such designs is that they compromise the quality of the vision. Given the influence of compliance of lens wear on the efficacy, significant reduction of visual performance may promote poor compliance thus resulting in poorer efficacy. Accordingly, what is needed are designs for the correction of myopia and retardation of progression, which do not cause the visual disturbances associated with manipulation of optical power. The current disclosure proposes an alternative non-refractive method to retard myopia progression that does not utilise optical defocus as a stop signal. Embodiments of the disclosure propose an alternative method to retard the progression of myopia by artificially introducing edges, or luminous contrast profiles to the retinal image. The cost burden for prospective spectacle wearer who desires to have access to myopia management is significant as the standard of care in myopia management with existing solutions is prohibitively expensive. The current disclosure address the issue of the cost burden by contemplating one or more embodiments that relates to the utility of impermanent inexpensive optical films used in conjunction with traditional spectacle lenses.

Certain embodiments further introduce spatio-temporal variations of the luminous contrast profiles into the imagery that is projected onto the retina through the optical films or sheets used in conjunction with standard single vision spectacle lenses as disclosed herein, and thereby increase the overall retinal activity which in turn may inhibit further eye growth. One or more of the embodiments of the present disclosure rely on the centre-surround architecture of the retinal ganglion cells producing preferential responses to spatial and/or temporal changes in the luminous profile incident on the retina.

In this section, the present disclosure is described in detail with reference to one or more optical film embodiments to be used in conjunction with standard single vision spectacle lenses, some of the contemplated embodiments are illustrated and supported by accompanying figures. Some optical film embodiments to be used in conjunction with standard single vision spectacle lenses are provided by way of explanation and are not to be construed as limiting to the scope of the disclosure.

The following description is provided in relation to several optical film embodiments that may share common characteristics and features of the disclosure. It is to be understood that one or more features of one embodiment may be combined with one or more features of any other embodiments which may constitute additional embodiments. The functional and structural information disclosed herein is not to be interpreted as limiting in any way and should be construed merely as a representative basis for teaching a person skilled in the art to employ the disclosed embodiments and variations of those embodiments in various ways.

The sub-titles and relevant subject headings used in the detailed description section have been included only for the ease of reference of the reader and should in no way be used to limit the subject matter described throughout the disclosure or the claims of the disclosure. The sub-titles and relevant subject headings should not be used in construing the scope of the claims or the claim limitations.

Some of the techniques that have been reported to be usable to identify individuals with a risk of developing myopia or progressive myopia include inquiries on one or more of the following factors: genetics, ethnicity, lifestyle, environmental, excessive near work, etc.

Certain embodiments of the present disclosure are directed towards a person identified as at risk of developing myopia or progressive myopia. To date, numerous optical designs have been proposed to control the rate of eye growth or to retard the progression of myopia. Some of these designs are characterised by the use of some degree of relative positive power related to the base prescription. Designs based on such optical principles invite significant compromise of the quality of vision. Given the influence of compliance of lens wear on the efficacy, a significant reduction of visual performance may promote poor compliance thus resulting in poorer efficacy.

Embodiments of the present disclosure relate to optical designs that utilise the effects of purposefully configured non-refractive opaque features on or within the optical film or sheet to be used in conjunction with a standard single vision spectacle lens to increase the retinal ganglion cell activity which in turn aids to inhibit or decelerate the rate of myopia progression. The current disclosure postulates that an active rise in the retinal encoding of the spatio-temporal signal has a protective effect on progressive myopia.

The human visual system is organised into on- and off-retinal channels or pathways. The retinal ganglion cells have circular receptive fields that are organised into on-centre/off-surround bipolar cells or vice versa, The workings of on-centre/off-surround retinal circuitry is succinctly described in FIG. 1 and FIG. 2.

The complex retinal ganglion cell circuitry aids in the conversion of the spatiotemporal information contained within the incident light of the visual input scene into spike trains and patterns of activity conveyed to the visual cortex by the axons of the retinal ganglion cells which form the fibres of the optic nerve.

Two groups of retinal ganglion cells, magno and parvo cells, aid in the different types of responses to the incoming light signal captured on the retina. The information carried by magno and parvo cells are parallel and independent to each other. The magnocellular or transient pathway captures the temporal features of the incoming light signal, for example, motion, changes, and onsets within the input scene; while the parvocellular or sustained pathway captures spatial features of the incoming light signal, for example, patterns and shapes within the input scene.

The magnocellular pathway has large receptive fields, short latencies, and responds in a transient way utilising rapidly conducting axons. The parvocellular pathway, on the other hand, has smaller receptive fields, long latencies and responds in a sustained way by utilising slow conducting axons. The relative change events captured by the magnocellular pathway and the grey-level sustained image frames captured by the parvocellular pathway are two highly orthogonal representations of the visual scene.

Given the regulation of eye growth is locally and not globally mediated, the magnocellular pathway may be involved in the regulation of the eye growth, or mediation of the homeostasis of eye growth, for at least some individuals. In other words, the magnocellular retinal ganglion cells, which contain the information on local relative changes, offer the ability to encode the dynamic or temporal contrast within the visual scene which can be transcribed into growth on- or growth off-signals.

Increase in spatiotemporal contrast of a visual scene has a potential to introduce a spike, or a short-duration increase, in the retinal ganglion cell activity; and the greater the retinal ganglion cell activity, the higher the growth inhibition signal for the eye. Due to the construct of the retinal receptive field circuitry, the following two conditions fail to excite the retinal ganglion cells: (a) a homogeneously illuminated retinal scene without distinct edges (i.e., absence of spatial contrast in the visual scenery); or (b) a lack of change in the scenery for too long (i.e., absence of temporal contrast).

The lower the excitation of the retinal ganglion cells the lower the firing activity which in turn signifies overall lower retinal activity; and the greater the inactivity of the retina the lower the growth inhibition signal resulting in further eye growth. The relative difference in the temporal integration of on- and off-receptive field activity determines further eye growth. The present disclosure postulates that an inactive retina triggers eye growth and an active retina inhibits the growth or triggers a stop signal. The present disclosure further contemplates that standard single vision spectacle lenses of the prior art and/or a spatially homogenous visual imagery contributes to a homogeneous and substantially edge-less visual imagery leaving the retina in a baseline state (i.e., baseline or constant firing pattern of the retinal ganglion cells) and thus promoting further eye growth leading to more myopia.

FIG. 1 illustrates the workings of the on-centre with off-surround, and the off-centre with on-surround types of retinal receptive fields, used to describe one or more of the embodiments of the present disclosure.

The first and third columns of FIG. 1 highlight four instances of theoretical stimulus presentation: (a) no light across the retinal receptive field (101 & 111); (b) no light in the central region of the retinal receptive field, while the surround is fully lit (102 & 112); (c) no light in the surround region of the retinal receptive field, while the central region is fully lit (103 & 113); and (d) both the central and surround regions of the retinal receptive field are fully lit (104 & 114). The second and fourth columns showcase the firing action potentials over time for the various corresponding stimulus conditions (a) to (d).

For example, when an on-centre with off-surround retinal receptive field is considered (i.e., first two columns of FIG. 1), in the absence of a light stimulus (101), the retinal ganglion cells fire at a baseline rate (106). When the light only falls on the off-surround region (102) and not on the on-centre region, then the baseline firing is suppressed during the stimulus period (107).

When a light spot coincides with the on-centre zone (103), the firing rate of the retinal ganglion cells is at its maximum (108). As the light circle expands to cover both on-centre and off-surround fields (104), the firing pattern diminishes from its maximum and gets closer to the basal firing rate (109). When an off-centre with on-surround receptive field is considered (i.e., last two columns of FIG. 1), in the absence of a light stimulus (111), the retinal ganglion cells fire at a baseline rate (116). When the light only falls on the on-surround region (112) and not on the off-centre region then the firing rate of the retinal ganglion cells is at its maximum (117). When a light spot coincides with the off-centre zone (113), the baseline firing is suppressed during the stimulus period (118).

As the light circle expands to cover both off-centre and on-surround fields (114), the firing pattern diminishes from its maximum and gets closer to the baseline firing rate (119). It can be appreciated by a person skilled in the art that the illustrations of FIG. 1 are theoretical best-case scenarios that may be difficult to replicate in real life scenarios other than bench-top lab experiments.

Figure 2:
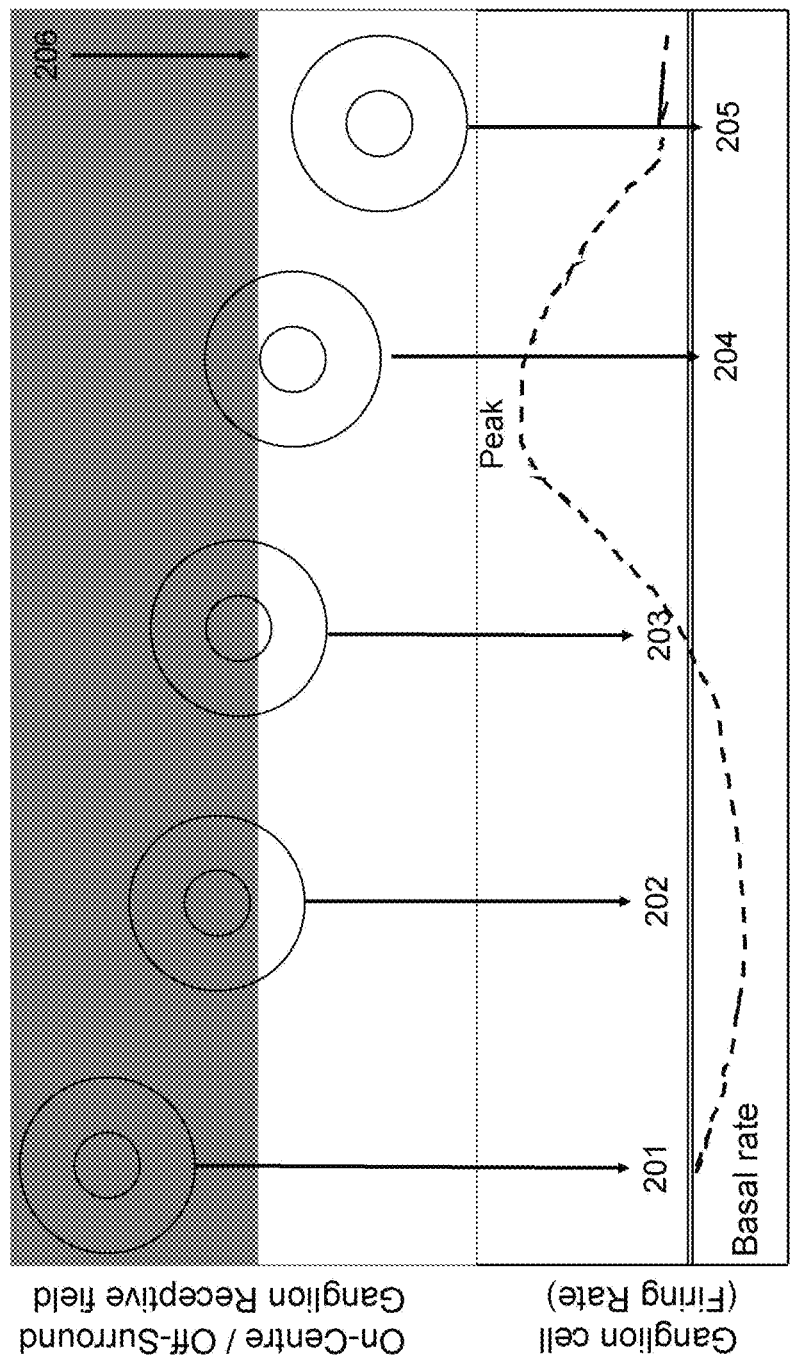
FIG. 2 illustrates the workings of on-centre/off-surround retinal receptive fields, when they are subjected to different stimulus or edge profile conditions, according to certain embodiments.

FIG. 2 is another graphical illustration of the firing pattern of an on-centre with off-surround retinal receptive field, when subjected to different stimulus conditions. The top half of FIG. 2 showcases five different light stimulus conditions depicting some of the edge (206) detection scenarios that the receptive field may encounter: (i) when the entire receptive field lies in the dark part of the edge (201); (ii) when a part of the surround is in the bright side of the edge, while the centre and the remainder of the off-surround zone are still in the dark part of the edge (202); (iii) when a part of the off-surround and the on-centre region is on the bright side of the edge, while the majority of the on-centre and off-surround region is in the dark patch of the edge (203); (iv) when all of the on-centre region is in the bright side of the edge, while some of the off-surround region is on the dark side of the edge (204); and lastly (v) when the entire receptive field is in the bright side of the edge (205).

The bottom half of FIG. 2 showcases the ganglion cell firing action potential for the five different edge detection scenarios (201-205) that the receptive field may encounter over time. For example, when the entire receptive field lies in the dark part of the edge (201), the firing rate of the ganglion cells is at a basal rate, shown as the double black solid line of FIG. 2. When a part of the off-surround region is in the bright side of the edge, while the on-centre is still in the dark side of the edge (202), the firing rate of the ganglion cells is suppressed below the basal rate. When a part of the off-surround and the on-centre region moves towards the bright side of the edge (203), the firing rate is back to the basal rate. When the entire central region is in the bright side of the edge with some of the surround on the dark side (204), the firing rate achieves its peak. Finally, when the entire receptive field is in the bright side of the edge (205), the firing rate drops close towards the basal rate but slightly on the higher range. The surround of the receptive field also influences the amount of glutamate released by the photoreceptors. If the surround field is dark, then the photoreceptors in this region will depolarise causing release of more glutamate. When light falls on the on-centre region, while at least some portion of the off-surround experiences relative darkness, the horizontal cells connected to the photoreceptors in the surround field will depolarise in response to the glutamate and release their own inhibitory neurotransmitter, which will further inhibit the centre photoreceptors to make them release even less glutamate. This situation will create the highest response in the firing action potential of the retinal ganglion cells.

Exactly the opposite happens when the surround is in presence of light. The photoreceptor will hyperpolarise in the surround causing it to release less glutamate. The horizontal cells connected to the photoreceptors in the surround field will hyperpolarise in response and release less of their own inhibitory neurotransmitters, which produces less inhibitory response allowing the central photoreceptor not to be inhibited and release even more glutamate. This is a situation that will create the highest response in an off-centre ganglion receptive field.

Virtual Retinal Models

FIG. 2 illustrates theoretical working models of on- and off-channel retinal fields in human eyes. To show pertinence to various real-life test cases, a virtual retinal simulation platform is utilised to demonstrate the workings of various embodiments. The operating principles and technical framework of the virtual retinal platform utilised is described herein. The virtual retinal platform is configured to utilise a set of retinal images, comprising a temporal sequence, as an input and convert them into an output of a set of spike trains or action potentials, which signify the overall activity of the retina. In essence, the edge-detection ability of the centre-surround architecture of the ganglion cells offering a preferential response to spatial and/or temporal changes to the incoming visual scenes was utilised herein. Several variables within the framework of the virtual retinal platform can be tailored to finetune the emulation of wide-field retinal images to mimic real-life scenarios. Some information about the retinal circuitry and neurophysiology described in the following scientific articles is required to perform the invention disclosed herein. Herewith, a scientific journal article entitled "Probing the potency of Artificial Dynamic On- or Off-stimuli to inhibit myopia development" written by Wang, Aleman and Schaeffel and published in Investigative Ophthalmology and Vision Science journal in June 2019 is referenced herein in its entirety. Another article written by Wohrer and Kornprobst and published in the Journal of Computational Neuroscience in 2009 entitled "Virtual Retina: A biological retina model and simulator, with contrast gain control" is referenced herein in its entirety. In addition, another scientific article entitled "A New Platform for Retinal Analysis and Simulation" written by the authors Cessac, Kornprobst, Kraria, Nasser, Pamplona, Portelli, and Viéville, and published in the journal of Frontiers of Neuroinformatics in 2017, is also referenced herein in its entirety.

Ideally, the source input retinal images for the virtual retinal platform should be a close representative of the images formed on the individual human retina, obtained when an individual is wearing one of the contemplated embodiments disclosed herein. As the actual retinal images are not accessible, the workings of the contemplated images can be emulated using schematic model eyes fitted with the disclosed embodiments, or alternatively, the images can be obtained using physical model eyes fitted with embodiments disclosed herein. The current disclosure extensively utilises advanced ray-tracing and schematic modelling to obtain virtual retinal images of various objects, when a range of ametropic schematic model eyes are fitted with a range of embodiments disclosed herein. For other embodiments, one may consider alternative approaches which involve utility of a physical or bench-top model eye to demonstrate the workings of the disclosed embodiments. Established models of virtual retinal processing were utilised to describe the workings of various ophthalmic lens embodiments of the present disclosure.

Figure 3:
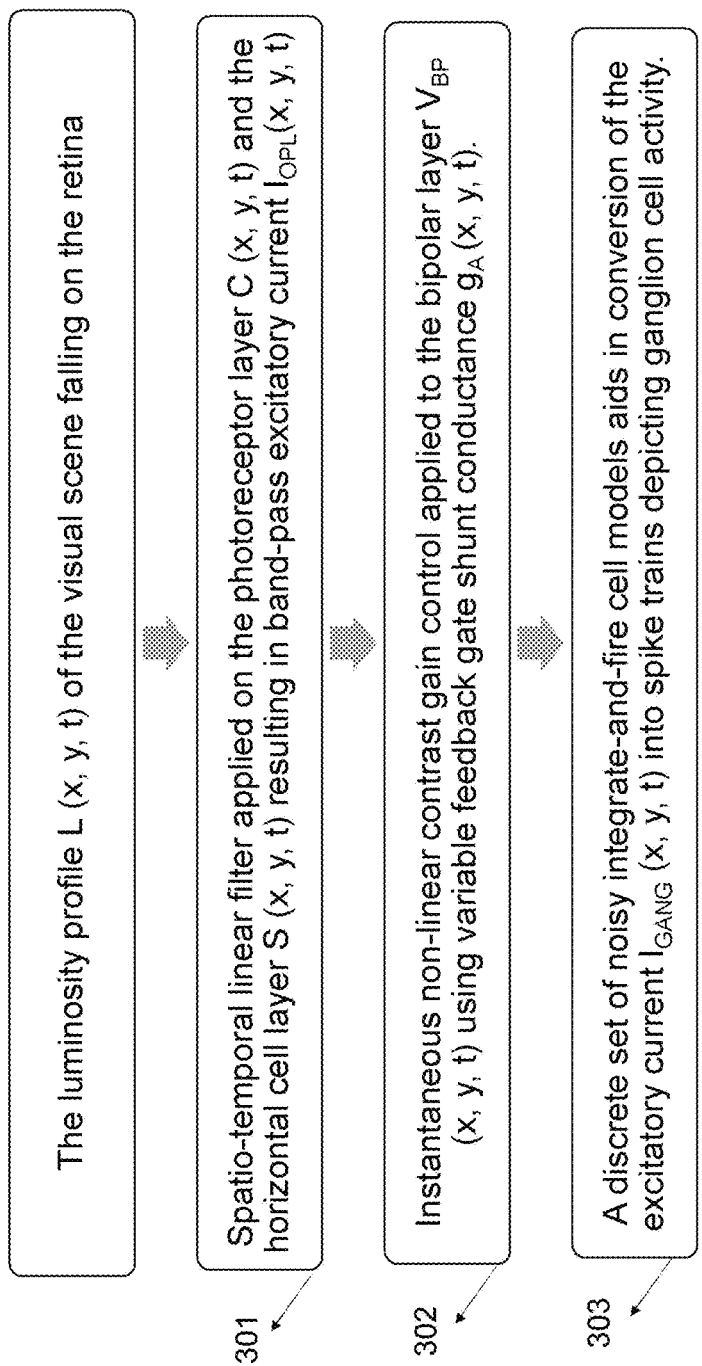
FIG. 3 illustrates a flowchart outlining the virtual retinal platform used to describe workings of some embodiments of the present disclosure. The virtual retinal platform relies on the three-layer structure of the retina: outer plexiform layer, contrast gain control and ganglion cell layer; these retina-related tools aided in encoding visual scenes into trains of action potentials, as described herein.

FIG. 3 represents the flow chart of the global structure of the virtual retinal model utilised as a platform to describe the inner workings of various embodiments disclosed herein. This model is adapted from the work of Wohrer and Kornprobst published as a peer review paper entitled "Virtual Retina: A biological retina model and simulator, with contrast gain control". The proposed three-layer architecture (FIG. 3) of a virtual retinal model facilitates successive continuous spatiotemporal maps that progressively transmit and transform the incoming signal present in a visual scene. The incoming retinal signal has a luminosity profile of L (x, y, t); wherein the luminance is defined for every spatially separated point or pixel (x, y) of the retina at a time point (t).

For all simulations used to describe the embodiments of the present disclosure, the input visual scenes were digitised to have intensities between 0 and 255 representing an 8-bit grey level. However, use of input images with intensities between 0 and 1023, or 0 and 4095, or 0 and 65535, representing a 10-bit, or a 12-bit, or a 16-bit grey levels may also be used to demonstrate the utility of other embodiments of the present disclosure. The subsequent layers of the virtual retinal cells are modelled as spatial continuums driven by a set of mathematical equations described herein.

As noted from the chart of FIG. 3, the first stage of virtual retinal model involves processing of the input signal in the outer plexiform layer which involves photoreceptors and horizontal cells. In the first stage, a simple spatiotemporal linear filter based on the teachings of Wohrer and Kornprobst referenced herein is used to decompose the input sequence L (x, y, t) into the photoreceptor centre response C (x, y, t) and response of the horizontal surround cells S (x, y, t). Further, the responses C (x, y, t) and S (x, y, t) are utilised in the outer plexiform layer filter to define a bandpass excitatory current $I_{OPL}$ (x, y, t) which is then fed to the bipolar cells in the second stage of the model. An instantaneous non-linear contrast gain control is applied to the bipolar layer $V_{BP}$ (x, y, t) using variable feedback gate shunt conductance $g_A$ (x, y, t) resulting in the excitatory current $I_{GANG}$ (x, y, t).

In the third stage, a discrete set of equations governing the noisy integrate-and-fire cell models aids in the conversion of $I_{GANG}$ (x, y, t) into spike trains used to gauge the retinal ganglion cell activity. The spikes can be modelled using one-to-one connections or alternatively using synaptic pooling of the excitatory current received. To approximate the signal transformations that occur in the layers of the retina, multiple linear filters are used in different stages of the model. To simplify the complexity of the computations and to minimise large computational inefficiencies, while maintaining pertinence to the real-world, some assumptions are made in the model to describe the workings of the embodiments of the present disclosure. The present disclosure is not limited to the virtual retinal models to describe the workings of the embodiments and use of modifications to the disclosed models and alterative models for design or verification are considered to be within the scope of the invention. In the first stage of the virtual retinal model occurring in the outer plexiform layer, the resulting current $I_{OPL}$(x, y, t) received by the bipolar cells from the photoreceptors C (x, y, t) and horizontal cells S (x, y, t) is obtained as:

$$I_{OPL}(x,y,t) = \lambda_{OPL}(C(x,y,t) - w_{OPL}S(x,y,t)) \quad \text{Equation 1:}$$

$$C(x,y,t) = G_{\sigma C}(*^{x,y}) T_{\omega U, \tau U}(*^t) E_{\eta C, \tau C}(*^t) L(x,y,t) \quad \text{Equation 2:}$$

$$S(x,y,t) = G_{\sigma S}(*^{x,y}) E_{\tau S}(*^t) C(x,y,t) \quad \text{Equation 3:}$$

In Equation 1, C (x, y, t) represents the centre signal associated with photoreceptors; and S (x, y, t) represents the surround signal associated with horizontal cells. The phototransduction process is modelled as a partially transient linear kernel cascade with exponential temporal low-pass kernel $E_{\tau S}$ and Gamma exponential cascade $E_{\eta C, \tau C}$ modulated by a partially transient filter $T_{\omega U, \tau U}$. The symbol C in Equation 2 represents a kernel operation on the centre signal, U stands for undershoot, and S in Equation 3 represents a kernel operation on the surround signal. The function $G_{\sigma c}$ in Equation 2 encompasses the spatial blur of the gap junctions between the photoreceptors. The function $G_{\sigma s}$ in Equation 3 encompasses the spatial blur of the coupling gap junctions between the horizontal cells. The sign $(*^t)$ in Equations 2 and 3 denotes temporal convolution; while the sign $(*^{x,y})$ denotes spatial convolution. signs are used henceforth in this disclosure to denote temporal and spatial convolution. The constant $\lambda_{OPL}$ is the overall gain of the centre-surround filter; while $w_{OPL}$ is the relative weight of the centre and surround signals. The contrast gain control operation in the second stage of the virtual retinal model describes the influence of the local contrast of the visual input scene on the electrical signal transfer properties of the retina, which is intrinsically nonlinear and dynamic. The contrast gain control based on a nonlinear feedback loop at the level of bipolar cells can be described as:

$$\frac{d}{dt}(V_{BP})(x, y, t) = I_{OPL}(x, y, t) - g_A(x, y, t) * (V_{BP})(x, y, t) \quad \text{Equation 4}$$

$$g_A(x, y, t) = G_{\sigma A}\binom{x, y}{*} E_{\tau A}\binom{t}{*} Q(V_{BP})(x, y, t) \quad \text{Equation 5}$$

$$Q(V_{BP}) = g_A^0 + \lambda_{OPL} V_{BP}^2 \quad \text{Equation 6}$$

In Equations 4, 5 and 6, $g_A$ represents a variable leakage in the membranes of the bipolar cells which can be activated using a static function $QV_{BP}$. The leakage determines the gain of the current integration at this level with a divisive effect of $g_A$ on the evolution of $V_{BP}$. In the models, $g_A$ depends dynamically on the values considered by bipolar cells with a time scale τA and spatial extent σA.

The third stage of the virtual retinal model involves the generation of spike trains of the retinal ganglion cells from the bipolar cells' activities. The bipolar signal $V_{BP}$ is rectified and receives additional spatiotemporal shaping to produce an excitatory current on ganglion cells $I_{GANG}$ (x, y, t), described in Equations 7 and 8.

$$I_{GANG}(x, y, t) = G_{\sigma G}\binom{x, y}{*} N\left[\varepsilon T_{\omega G, \tau G}\binom{\tau}{*} (V_{BP})(x, y, t)\right] \quad \text{Equation 7}$$

-continued $$N(V) = \begin{cases} \dfrac{i_G^0}{1 - \lambda_G(V - v_G^0)/i_G^0} & \text{if } V < v_G^0 \\ i_G^0 + \lambda_G(V - v_G^0) & \text{if } V \geq v_G^0 \end{cases} \quad \text{Equation 8}$$

The model proposed by Wohrer and Kornprobst used an empirical formula to model signal shaping in the transition from bipolar cells to centre-surround ganglion cell current. These models were adapted for demonstrating the workings of one or more of the embodiments disclosed herein. The model proposes use of a number of variables allowing for diversity in the functional reproduction of the responses expected from an alternate biologically plausible model, as described in Equations 7 and 8. The parameter ε takes two input values −1 and +1, wherein a negative value represents the off-ganglion cell activity, and a positive value allows for representation of on-ganglion cell activity. The bipolar layer signal is rectified using static nonlinear function N(V); wherein the parameters $\lambda_G$ and $i_G^0$ have the dimensions of reduced currents; while $v_G^0$ is the linearity threshold of the ganglion cells. Some additional models were proposed by Masmoudi, Antonini and Kornprobst, in a paper entitled "Streaming an image through the eye: the retina seen as a dithered scalable image coder" published in journal of signal processing: Image Communication, Volume 28 (2013), which is incorporated herein in its entirety.

From $I_{GANG}$ (x, y, t), an array of noisy leaky-integrate-and-fire neurons (nLIF), produces the set of output spikes. In real retinas, additional complex transformations of the electrical signal occur, facilitated by the synaptic structures of the inner plexiform layer, which is the locus of synaptic interactions between bipolar cells, amacrine cells and ganglion cells. For the purpose of the modelling to demonstrate the effects of embodiments of the disclosure, the complex synaptic relationships between the amacrine cells, and bipolar cells are ignored in lieu of computational efficiency in some examples.

While in some other examples, one or more of the complexities of the interactions between horizontal cells and bipolar cells, amacrine cells and bipolar cells are taken into consideration, as disclosed herein. Further extension of the model to include various other plausible combinations of outer and inner plexiform layer interactions to describe the workings of contemplated ophthalmic lens embodiments of the disclosure are considered within the scope of the invention.

The transformation of the continuous signal $I_{GANG}$ (x, y, t) into a discrete set of spike trains are obtained from the output of cells using a standard nLIF model described as:

$$\frac{d}{dt}(V_n)(t) = I_{GANG}(x_n, y_n, t) - g^L * (V_n)(t) + (\eta_v)(t) \quad \text{Equation 9}$$

The standard nLIF model spikes when threshold is reached: $(V_n)(t)=1$ and in the refractory period: $(V_n)(t)=0$. Wherein $(\eta_v)(t)$ is a noise source that can be added to the spike generation process in order to reproduce the variability in the real ganglion cells.

To emulate the spikes of the retinal ganglion cell layer, a virtual retina was defined in the model using the following parameters that offer relative biological plausibility and adaptable degree of complexity. The following example of FIG. 4 establishes the validity of the virtual retinal model described above, configured with certain specific retinal parameters described herein.

In this example, a series of 50 image frames, each with a dimension of 512×512 pixels, were configured as an image montage to serve as an input source for the virtual retinal model. The odd numbered frames of the video input stream consisted of a central circular bright region on a dark background (401), while the even numbered frames were configured with a central circular dark region on a white background (402). In this example, each frame was configured to be presented for 50 milliseconds accounting for 2.5 seconds of real time stimulation presentation for the virtual retinal model. For both the odd and even frames of the video input stream, the diameter of the central circular region was configured to be approximately 50 pixels, which is equivalent of 0.5° angular subtense of the fovea. The bit depth for each pixel in the input stream were digitised to range from 0 to 255 (i.e., 8-bit). The angular subtense of the video input stream was configured such that each frame subtended approximately 5°×5° on the foveal region of the model retina. Two simulation test conditions were used to calculate the retinal ganglion cell activity when the input image streams were presented on the virtual retina. The simulations were run in two different cell polarities: on- and off-cell modes. The retinal activity was gauged by the spike activity emanating from the ganglion cell layer of the virtual retinal model. The spike activity for each test condition was represented as average neuronal spike train for each bundle and as a peri-stimulus histogram representation showcasing the average spike rate as a function of time. The first test condition included one neuron bundle (403), which was positioned such that the centre of video input stream coincided with the centre of the circular neuron bundle. The second test condition included seven circular neuron bundles (404), which were position in a hexagonal pattern with one bundle at the centre of the video input stream and the remaining six bundles arranged circumferentially such that the circumference diameter subtended approximately 2.5°× 2.5° on the foveal region of the model retina. Additionally, for demonstrating the workings for the virtual retinal platform, in this example, the outer plexiform layer was configured to have a centre region subtending approximately 1.5° (i.e., σC of Equation 2) and a surround region subtending approximately 4.75° (i.e., σS of Equation 3). The centre and surround temporal scale of the outer plexiform layer were set to approximately 1 milli-seconds, which represent variables τC and τS of Equations 2 and 3, respectively. The variables governing the integration centre-surround signals, as described in the Equation 1 herein, were chosen to be $w_{OPL}=1$ and $\lambda_{OPL}=10$.

Figure 4:
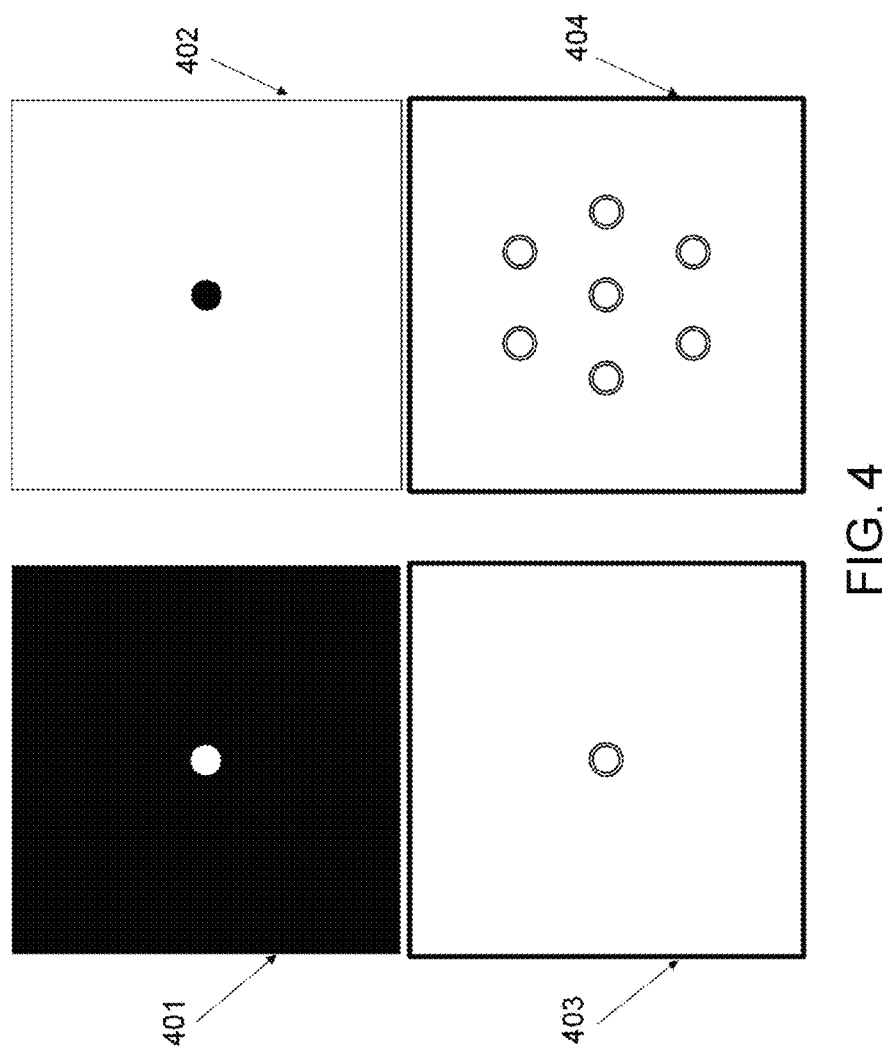
FIG. 4 is a basic sample of retinal input images onto the retinal receptors assembled to demonstrate the function of the virtual retinal platform used to describe workings of some embodiments of the present disclosure.
Figure 5:
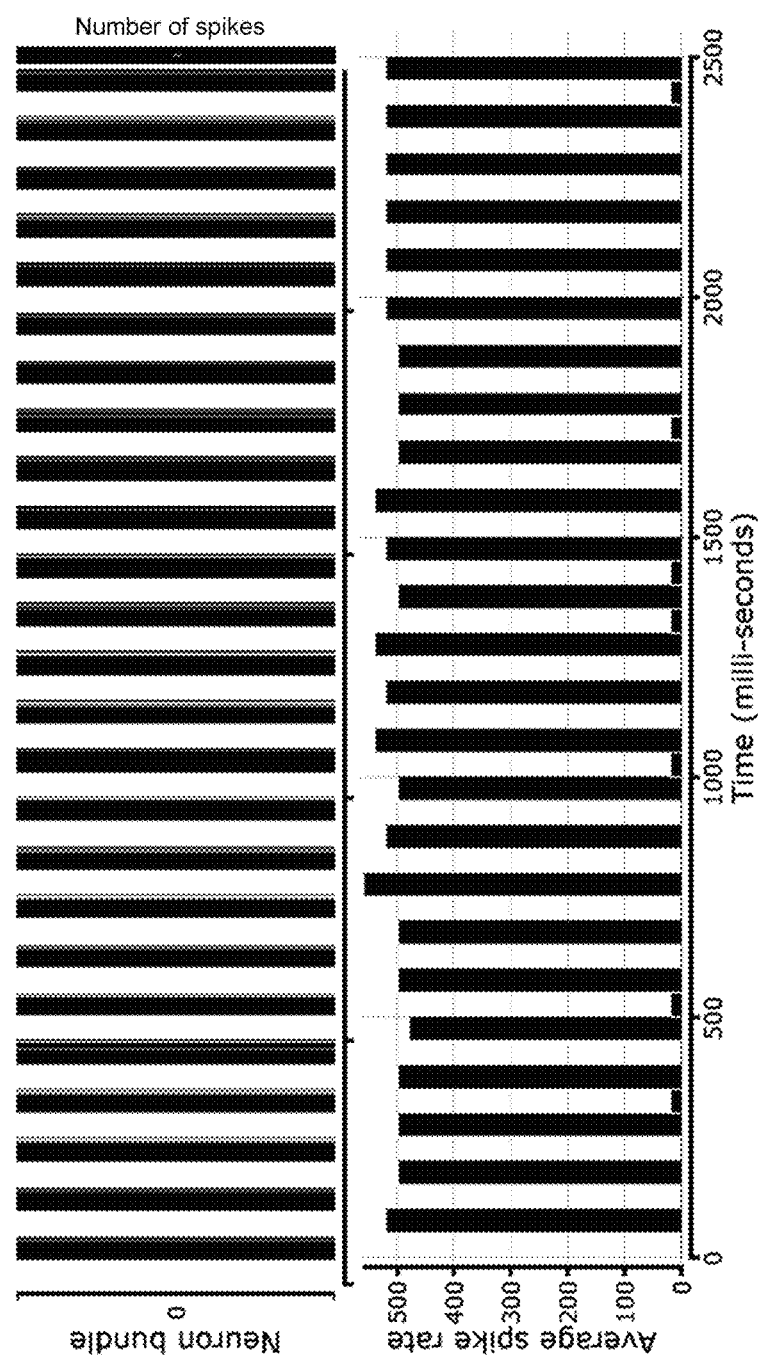
FIG. 5 illustrates the spike train (i.e., raster plot) for a sample neuron position at the retinal receptor plane and average retinal spike rate for one of the basic retinal configurations disclosed herein. Retinal ganglion cell responses to spatially uniform flicker between black dot on white background and white dot on black background.
Figure 6:
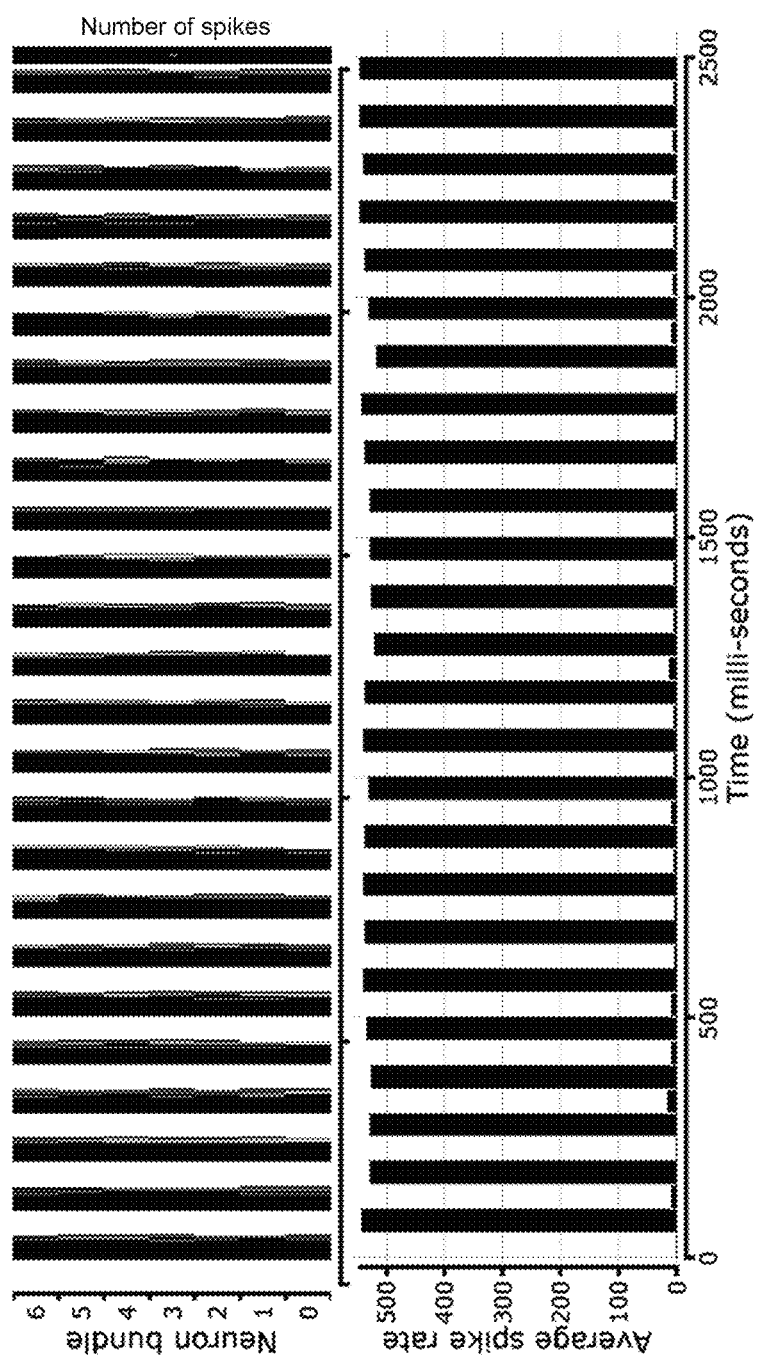
FIG. 6 illustrates the spike train (i.e., raster plots) for a sample neuron position at the retinal receptor plane and average retinal spike rate for another retinal configuration disclosed herein. Retinal ganglion cell responses to spatially uniform flicker between black dot on white background and white dot on black background.

Given the simplicity of the input image stimulus characteristics considered in this example of FIG. 4, the option for contrast gain control mechanism and lateral connectivity of the amacrine cells were muted when computing the spike train and spike rate analysis. The static nonlinearity coefficients of the bipolar and ganglion cell synapses were adapted from Wohrer and Kornprobst, wherein the bipolar linear threshold was set to 0, while the linear threshold value was held constant at 80, and the bipolar amplification value at 100. The values for neuron model were also adapted from Wohrer and Kornprobst, wherein a leak of 0.75, neuronal noise of 20, membrane capacitance of 150 and firing threshold of 2.4 were considered for the example described in FIGS. 4, 5 and 6. The post-synaptic pooling variable Sigma was ignored.

To demonstrate the workings of one or more embodiments of the present disclosure, static nonlinearity coefficients of the bipolar and ganglion cell synapses may be different from those used for the example of FIG. 4. For example, in some embodiments the bipolar linear threshold may be at least 2, at least 5, at least 10 or at least 15. To demonstrate the workings of one or more embodiments of the present disclosure, the linear threshold value may be a constant value of at least 30, at least 60, at least 90 or at least 120. To demonstrate the workings of one or more ophthalmic lens embodiments of the present disclosure, the bipolar amplification value may be at least 50, at least 75, at least 125 or at least 150.

To demonstrate the workings of one or more embodiments of the present disclosure, the leak of neuron model may be set to a value of at least 0.25, at least 0.5, at least 1 or at least 1.25. To demonstrate the workings of one or more ophthalmic lens embodiments of the present disclosure, the neuronal noise may be set to at least 10, at least 25 or at least 50. To demonstrate the workings of one or more embodiments of the present disclosure, the firing threshold of the neurons may be set to at least 1.2, at least 2.4 or at least 3.6. In various other example embodiments used to describe the workings for the optical film or sheet embodiments to be used in conjunction with a standard single vision spectacle lens of the present disclosure, various configurations may be contemplated with varying degrees of complexities, as described in Equations 1 to 9, as described herein.

Non-Refractive Opaque Features of Disclosed Embodiments

Due to the arrangement of the retinal pathways into the on- and off-channels, in the temporal domain, the retinal neurons respond predominantly to rapidly increasing luminance (on-cells) or decreasing luminance (off-cells) within a visual scene. In the spatial domain, the retinal receptive fields are arranged in a circular pattern into a centre-on and surround-off region or vice versa. Such an arrangement of the retinal cells allows for optimised utilisation of the retinal circuitry to achieve the desired visual processing while maintaining adequate spatial and/or temporal resolution. A definitive lack of spatial and/or temporal variation within the visual scenes captured at the retinal plane results in poor excitation of retinal ganglion cells and poor retinal activity, or an inactive retina, or insufficiently active retina, is postulated to trigger eye growth. Certain embodiments of the present disclosure are directed towards a person at a risk of developing myopia or progressive myopia.

One or more of the embodiments of the present disclosure rely on the hypothesis that a definitive lack of distinct edges, temporally varying distinct edges, or spatial luminous contrast profiles, or temporally varying spatial luminous contrast profiles, across the retina, may contribute towards retinal ganglion cell activity that is akin to its baseline state, in other words a substantially inactive retina.

The output of all receptive fields is integrated, reflecting the relative on- and off-input strengths for a visual environment. The relative difference in the temporal integration of on- and off-receptive field activity is postulated to determine further eye growth. The present disclosure postulates that an inactive retina triggers eye growth and an active retina inhibits the growth or triggers a stop signal.

The present disclosure further contemplates that standard single vision ophthalmic lenses of the prior art and/or a spatially homogenous visual imagery contributes to a homogeneous and substantially spatially edge-less visual imagery leaving the retina in a baseline state (i.e., baseline or constant firing pattern of the retinal ganglion cells) and thus promoting further eye growth leading to more myopia. One or more of the following advantages are found in one or more of the disclosed embodiment designs disclosed herein.

An optical film or sheet used in conjunction with a standard single vision spectacle lens providing a stop-signal to retard the rate of eye growth or stop the rate of eye growth, or increase in the state of refractive error, of the wearer's eye based on an increase in retinal activity by employing a plurality of nonrefractive features to artificially introducing edges or enhanced luminous spatial contrast profiles or enhanced temporal contrast profiles into the retinal imagery produced through configuration of contemplated design features of the optical film or sheet. In some examples, the optical films may be permanently attached to the standard single vision spectacle lens, while in other examples, they may be configured impermanently to obtain additional advantages, as disclosed herein.

One distinct difference of the current disclosure is utility of an optical film, or sheet, based device or method that is not solely based on optical manipulation of defocus, astigmatism, or positive spherical aberration, all of which is prior art and suffers from the potential visual performance degradation for the wearer. The following exemplary embodiment is directed to methods of modifying the incoming light through an optical film, or sheet, used in conjunction with a standard single vision spectacle lens that can utilise the selective effects of on and off-visual pathways on eye growth and myopia progression. Thereby, transforming the standard single vision spectacle lens into a single vision myopia management spectacle lens.

A further distinct advantage of the present invention is to provide an auxiliary systems, methods and devices that is convenient to use with multiple pairs of spectacle lenses that a wearer may have. A further separate advantage of the present disclosure is to provide an economically advantageous myopia management option for a spectacle wearer. The following exemplary embodiment is directed towards methods of modifying the incoming light through an optical film or sheet used in conjunction with a standard single vision spectacle that offers increased retinal ganglion activity by stimulation of the on-pathways on the retina by artificially introducing inhomogeneity into the visual imagery and by creating, or increasing, the luminous contrast profiles (i.e., artificial edges) at the retinal plane of the corrected eye. This may be achieved by using substantially non refractive opaque features forming borders of a plurality of apertures, zones, or regions within the optical film or sheet.

In short, the use of the contemplated multiple apertures, non-refractive regions or non-refractive zones within the optical film or sheet to be used in conjunction with a standard single vision spectacle lens, may provide an increase of the activity of the retinal ganglion cells by stimulating the on- and/or off-pathways that are excited by the artificially introduced spatial edge profiles, when the light passes through the optical film or sheet used in conjunction with a standard single vision spectacle lens. The active rise in retinal encoding of spatio-temporal signal is postulated to discourage the slowing of myopia progression. Further, this use of excitatory zones, non-refractive regions, or a plurality of apertures within the optical film or sheet used in conjunction with a standard single vision spectacle lens may offer a variation in temporal contrast supplemented by eye movements as disclosed herein.

Optical Film Embodiments

Figure 7:
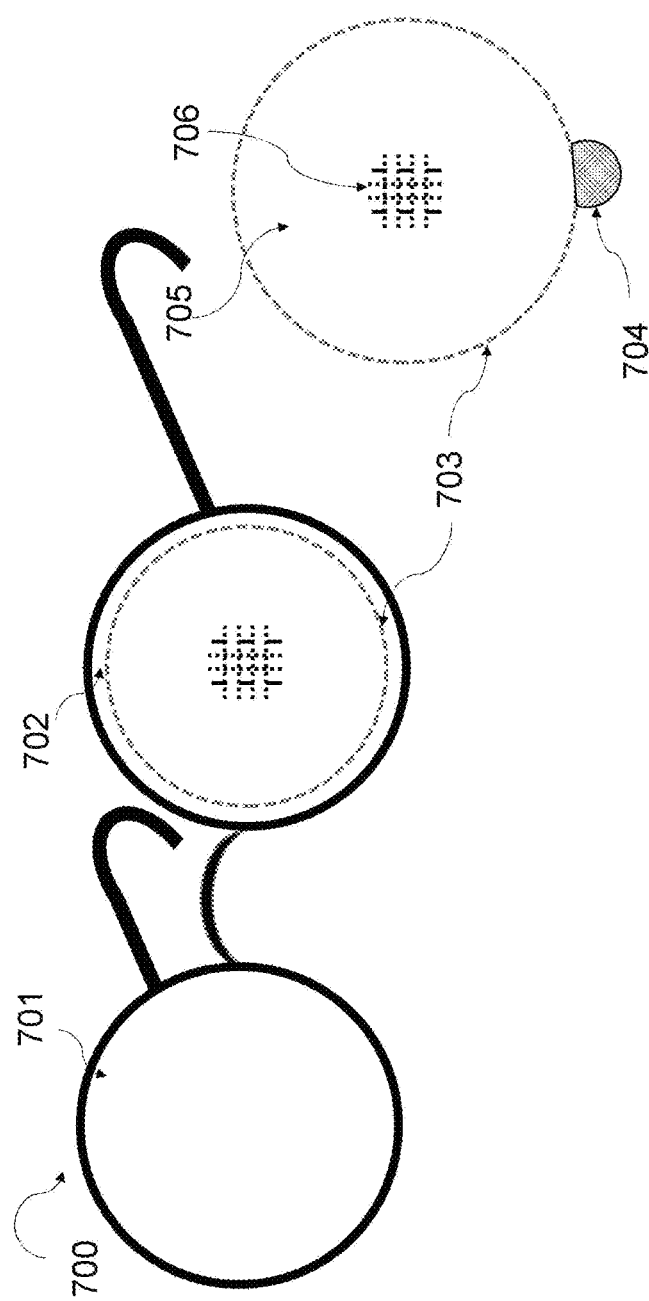
FIG. 7 illustrates a standard pair of single vision spectacle lenses used for the correction of myopia to which an optical sheet or film, as disclosed herein, is applied over substantially the entire surface area of the left spectacle lens to convert the left lens of the said standard pair of single vision spectacles to a myopia management spectacle lens.

Due to the inaccessibility of the images formed on the physical retina, the retinal activity may be gauged using various surrogate measures. One or more of the disclosed embodiments may be characterised structurally and/or functionally. The structural characterisation is performed by via inspection of the non-refractive opaque features configured within the optical film or sheet; while the functional characteristics of the optical film in conjunction with a single vision spectacle lens may be performed by using a model eye. Various optical film or sheet embodiments are shown and modelled to demonstrate that the non-refractive opaque features, used in conjunction with the single vision optical profiles, provide an increase in the retinal ganglion cell activity, gauged by the surrogate measures of an increase in the average retinal ganglion cell spike rate with the virtual retinal platform, emulating the performance in the eye of the wearer. FIG. 7 illustrates a standard pair of spectacles used for correction of myopia to which an optical sheet or film, is applied over substantially the entire surface area of the left spectacle lens to convert or transform the said standard pair of single vision spectacles to a pair of myopia management spectacles, wherein methods of dispensing the optical sheet or film are described herein. The left portion of FIG. 7 shows a pair of standard single vision spectacle lenses 700 with a right (701) and left lens (702) that may be used to correct the myopic refractive error with or without astigmatism.

The right portion of FIG. 7 shows an exemplary embodiment including an optical film, or sheet, designed to substantially cover the left lens 702 shown by dotted lines; wherein the optical film or sheet 703 is configured with substantially plano power 705 across the optical film, or sheet, and wherein the non-refractive opaque features 706 are configured such that they fall in the central region of the left lens of the spectacle lens. In this example, the region 705 of the optical film does not impart any additional optical power, or refractive components, when used in conjunction with the standard single vision spectacles.

The optical film or sheet may be peeled using the 704 portion of the film allowing it to be placed on the spectacle lens. In this example the optical film embodiment (703) configured with non-refractive opaque feature (706) comprises a grid pattern, including 4 horizontal lines, and 4 vertical lines. The grid pattern positioned in the centre of the spectacle lens embodiment spanning about 25 mm in height and width. In some examples, the optical film or sheet configured with non-refractive opaque features of the present invention includes an adhesive backing to adhere the optical sheet or film to the standard single vision spectacle lens. The adhesive backing may be a peel-able, a self-sticking, or any other suitable adhesive means to adhere to the optical film or sheet to the standard single vision spectacle lens.

An exemplary method of use of the disclosed optical film or sheet to be used in conjunction with the wearer's own spectacle lenses are described herein. For example, the shape of the wearer's own spectacle lenses and/or frame may be traced by an eye care practitioner, or an optical dispenser, or any other trained professional, to ascertain the shape and the size of the optical film or sheet that is required to comply with the care regimen disclosed herein. For example, the optical films or sheets may then be cut, or punched out, to substantially match the traced shape of their spectacle frame or lenses, in accordance with the current disclosure. The individually tailored films or sheets may then be dispensed in a form of a set or a kit that includes or comprises various permutation and combination of shapes, designs and locations of one or more non-refractive opaque features configured within the optical film or sheet, as described in FIG. 7.

An exemplary method of using the spectacle apparatus kit with optical films and/or sheets involves the following steps: (i) to measure the shape and size of the wearer's own spectacle lenses and/or frame to determine the shape and the size of the optical film; (ii) cut or punch-out the impermanent optical film such that it substantially matches the shape of their spectacle lenses or frame; (ii) dispense in a form of a set or a kit that includes the multiple pairs of cut or punched-out individually tailored pairs of optical films comprising various permutations and combinations of sizes, shapes, designs and locations of desired non-refractive opaque features configured within the optical film or sheet; and (iv) provide a set of instructions to comply with the specific care regimen. In some other examples, the optical film or sheet may be configured with at least two or three different non-refractive opaque features.

Figure 8:
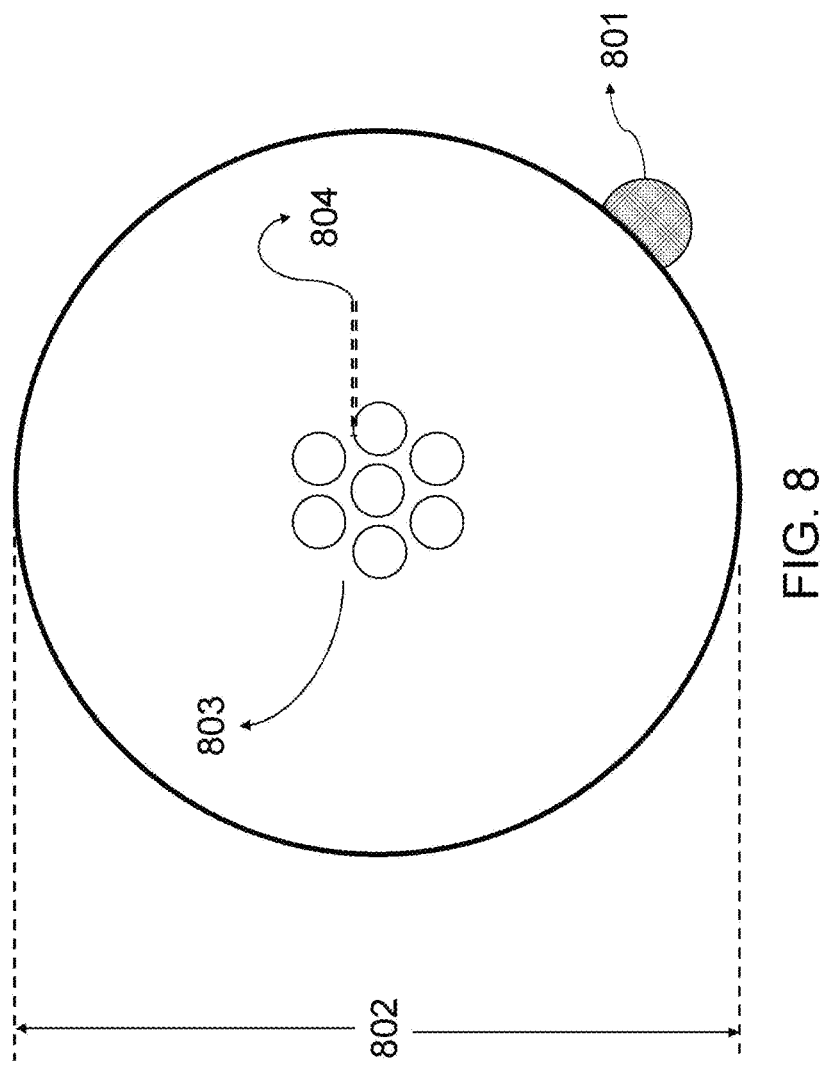
FIG. 8 illustrates the frontal view of an exemplary optical sheet or film embodiment with non-refractive opaque features arranged as multiple circular apertures, not to scale, as disclosed herein.

FIG. 8 shows the frontal view of an exemplary optical film or sheet embodiment, not to scale, with an optical film diameter (802) and a plurality of non-refractive opaque features of the contemplated design (803). The optical film may be peeled using the 801 portion allowing it to be placed on the single vision spectacle. In this exemplary example, the optical film diameter is approximately 25 mm and the non-refractive opaque features are arranged in the form of borders of the multiple circular apertures within the optic zone and are approximately 1 mm in diameter each.

The non-refractive opaque features (803) arranged in the form of multiple circular apertures may be configured to be between completely opaque and substantially opaque. For example, the transmission properties of the non-refractive opaque features, the borders of the multiple circular apertures in this example, may be configured such that the >85% of the light incident on the non-refractive opaque feature is absorbed or not transmitted. The width of the border of the multiple circular apertures, i.e., non-refractive opaque features, contemplated in FIG. 8 is approximately 50 µm (804). It is magnified relative to the size of the optical film described herein to demonstrate and improve legibility of the feature. The remainder of the optical film devoid of the contemplated non-refractive opaque features, including the transparent area within the plurality of apertures, is of plano power. Use of a plano power within substantial portion of the optical film offers a visual performance for the wearer that is substantially similar to the performance obtained with a single vison spectacle lens which is a further advantage of the present disclosure over the prior art.

Figure 9:
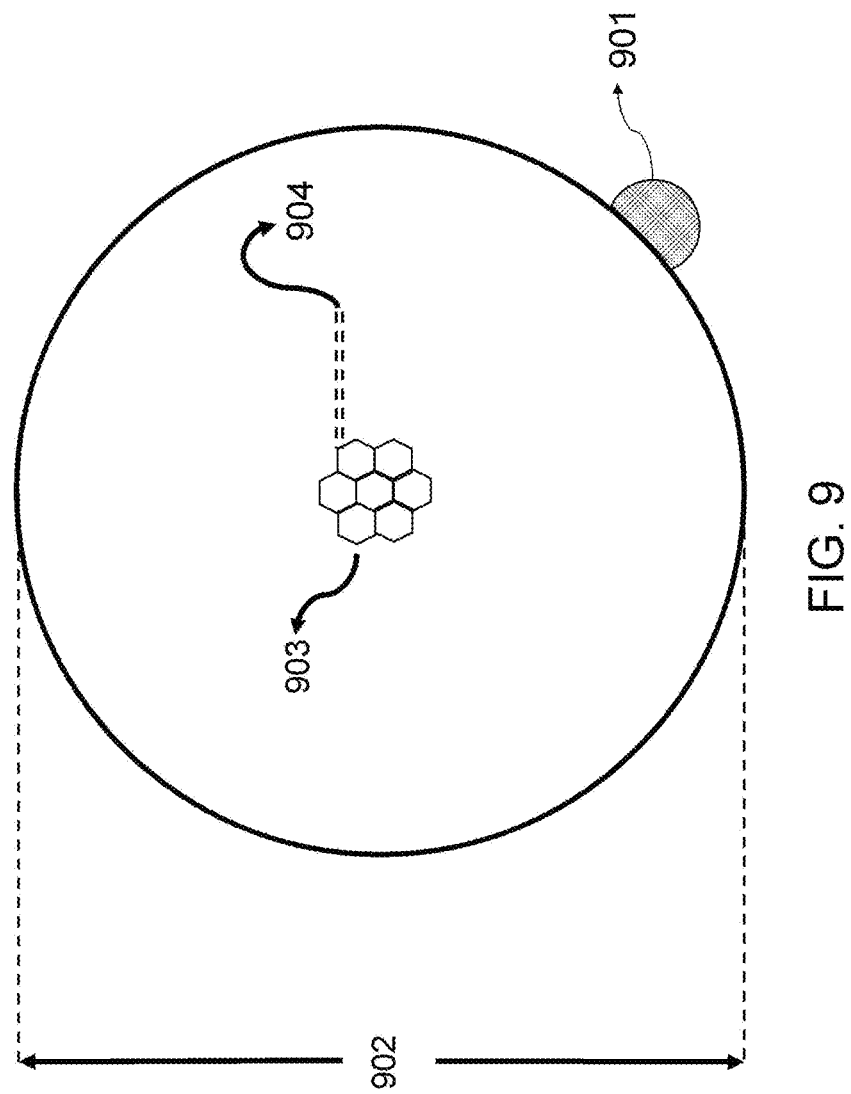
FIG. 9 illustrates the frontal view of another exemplary optical sheet or film embodiment with non-refractive opaque features arranged as multiple hexagonal apertures, not to scale, as disclosed herein.

FIG. 9 shows the frontal view of another exemplary optical film or sheet embodiment, not to scale, with an optical film diameter (902) and a plurality of conjoined hexagonal shaped non-refractive opaque features of the contemplated design (903). The optical film may be peeled using the 901 portion allowing it to be placed on the single vision spectacle.

In this exemplary example, the lens diameter is approximately 25 mm, and the non-refractive opaque features arranged in the form of the borders of multiple hexagonal apertures within the optic zone are approximately 1 mm in maximum diameter each. The non-refractive opaque features arranged in the form of multiple hexagonal apertures (903) may be configured to be between completely opaque or translucent. For example, the transmission properties may be configured such that the >90% of the light incident on the non-refractive opaque feature is absorbed or not transmitted. The width of the border of the multiple hexagonal apertures, i.e., non-refractive opaque features, contemplated in FIG. 9 is approximately 25 µm (904). It is magnified relative to the size of the optical film or sheet described herein to demonstrate and improve legibility of the feature. The remainder of the optical film devoid of the contemplated non-refractive opaque features, including the transparent area within the plurality of apertures, is of plano power.

In yet another optical film or sheet embodiment, the plurality of non-refractive opaque features may be arranged, as the borders of a plurality of circular, semi-circular, elliptical, or hexagonal, or any other polygon shaped, apertures; wherein the plurality includes at least 2, 3, 5, 7, 9, 12 or 15 non-refractive opaque features.

In some other optical film or sheet embodiment, the number of non-refractive design features arranged in form of the borders of the plurality of polygonal shaped apertures may be between 4 and 7, or between 3 and 9, or between 2 and 12, or between 3 and 15. In some embodiments, the non-refractive design features arranged in form of the borders of the plurality of apertures may be separated, while they may be adjoined, or conjoined, in other embodiments.

In some other embodiment, the border of the contemplated design features within the optical film, or sheet, may be opaque and yet in some other embodiments, the border of the contemplated design features may be translucent.

In some embodiments, the width of the border or design feature may not be constant across multiple apertures. The shapes of the multiple apertures may also be different within one embodiment of the present disclosure.

Figure 10:
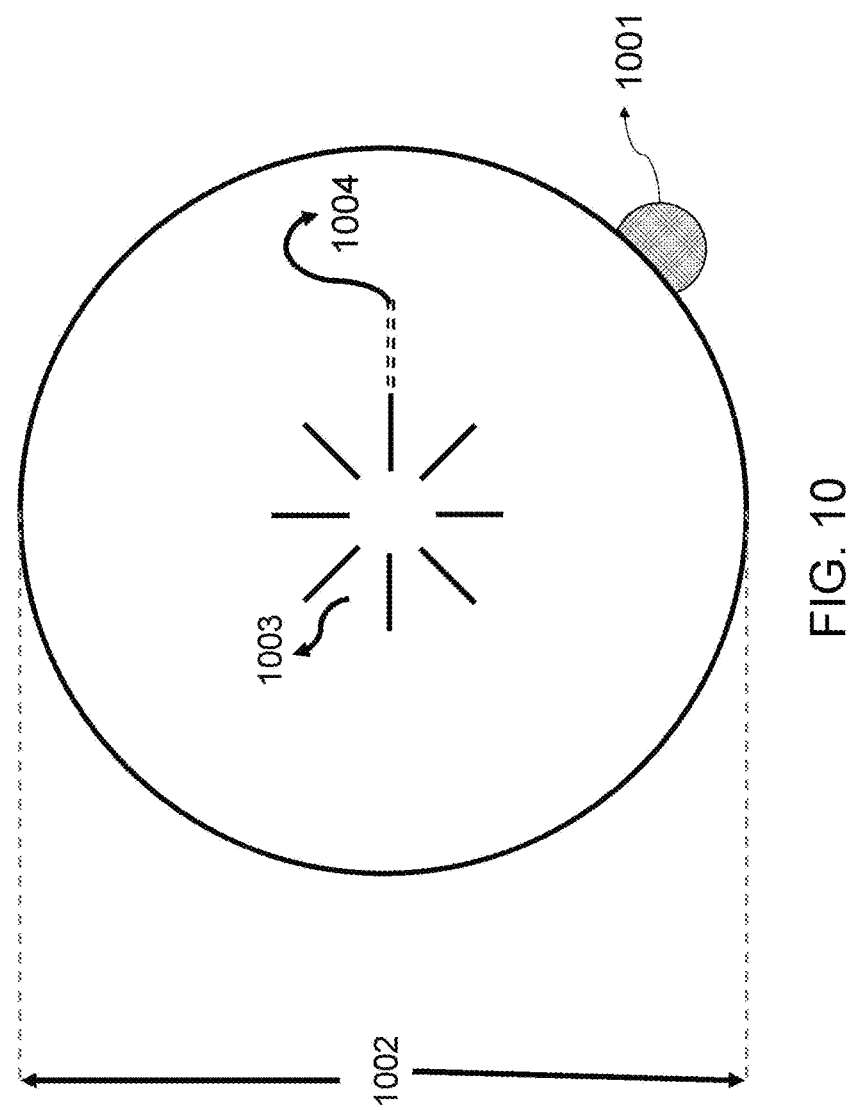
FIG. 10 illustrates the frontal view of yet another exemplary optical sheet or film embodiment with striae as non-refractive opaque features, not to scale, as disclosed herein.

FIG. 10 shows the frontal view of another exemplary optical film or sheet embodiment, not to scale, with an optical film diameter (1002) and a plurality of non-refractive opaque features (1003) of the contemplated design. The optical film may be peeled using the 1001 portion allowing it to be placed on the single vision spectacle. In this exemplary example, the optical film diameter is approximately 25 mm, and the non-refractive opaque features, configured as line segments, or striae, are approximately 2 mm in length. These non-refractive opaque features (1003) may be substantially opaque; wherein 95% of the light incident on the non-refractive opaque features is not transmitted or absorbed. The width of the non-refractive opaque features (1004) contemplated in FIG. 10 is approximately between 25 µm and 50 µm, it is only magnified in the figure to demonstrate the feature relative to the size of the optical film or sheet described herein. In a preferred embodiment, the maximum width of the non-refractive opaque features is not to exceed 100 µm, 150 µm, or 200 µm to avoid unwarranted consequential effects on the resolution characteristics.

Figure 11:
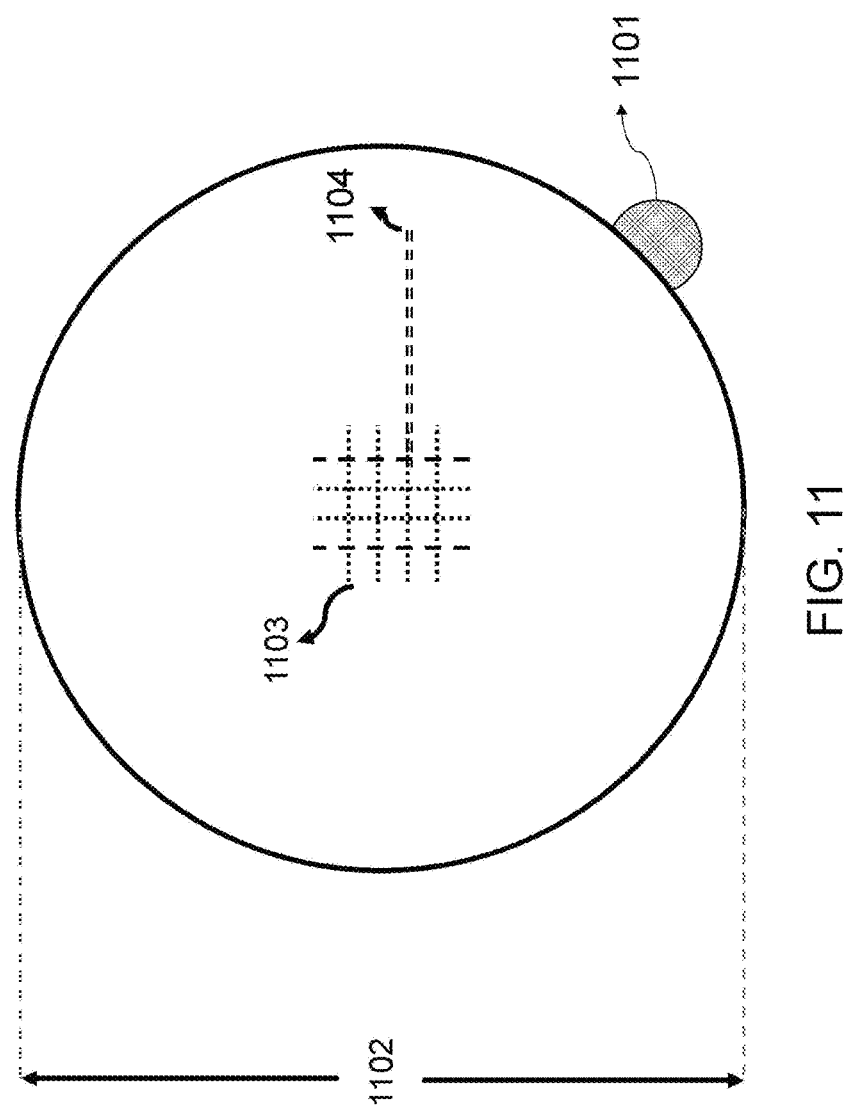
FIG. 11 illustrates the frontal view of yet another exemplary optical sheet or film embodiment with grid lines as non-refractive opaque features, not to scale, as disclosed herein.

In this example, the remainder of the optic zone devoid of the contemplated non-refractive opaque features, including the transparent area within the plurality of line segments, or striae, is of plano power. FIG. 11 shows the frontal view of another exemplary optical film or sheet embodiment, not to scale, with an optical film diameter (1102) and the non-refractive opaque feature (1103). The optical film may be peeled using the 1101 portion allowing it to be placed on the single vision spectacle.

In this example, the optical film diameter is approximately 25 mm in diameter and the contemplated design feature of this embodiment is a grid pattern, positioned in the centre of the optical film spanning about 10 mm in height and width. The borders of these grid lines (1103) may be configured completely opaque or substantially opaque. The width of the non-refractive opaque features (1104) contemplated in FIG. 11 is approximately between 50 µm and 100 µm, it is only magnified in the figure to demonstrate the feature relative to the size of the optical film or sheet described herein.

The embodiment of FIG. 11 may also be configured in other variations, for example, the contemplated non-refractive design features within the optic zone may be at least 5 µm, 10 µm, 20 µm, 30 µm, 40 µm or 50 µm in width. The embodiment of FIG. 11 may also be configured in other variations, for example, the contemplated non-refractive design features within the optical film may be between 5 and 15 µm, 15 and 25 µm, or 10 and 50 µm in width. In a preferred variation of the embodiment of FIG. 11, the maximum width of the non-refractive opaque features, i.e., width of the lines forming a grid pattern, does not to exceed 150 µm, 200 µm or 250 µm to avoid unwarranted consequential effects on the resolution characteristics of the eye.

In other embodiments, the contemplated non-refractive design feature may be positioned in the located in periphery of the optical film. In yet another optical film or sheet embodiment, the number of fine lines, or striae, forming the grid pattern, may be at least 5, 9, 15 or 25. In some other optical film or sheet embodiment, the number of design features, lines or striae, forming the grid pattern, may be between 5 and 9, or between 9 and 15, or between 9 and 15, or between 5 and 25. In one another embodiment, only one long substantially unbroken curvilinear line or a zig-zag line may be contemplated to run through the optical film or sheet with a length of at least 3 mm, 6 mm, 9 mm, or 12 mm.

In yet another optical film or sheet embodiment, the one or more striations may be arranged in a symmetric or random fashion, they may be centred with the geometrical centre of the optical film or sheet or decentred. Striations may also consist of straight or curved lines, they may touch or cross each other, or all be placed in isolation, or a combination thereof. Striations may vary in width and length. There may be different patterns applied to the optical films placed on the left and right lenses of the standard single vision spectacles.

In yet another optical film or sheet embodiment the contemplated design features (i.e., a plurality of striations or moiré pattern) within the optical film may be separated from each other. In yet another embodiment, the contemplated plurality of non-refractive opaque features may be configured adjacent to or interlaced with each other.

Figure 12:
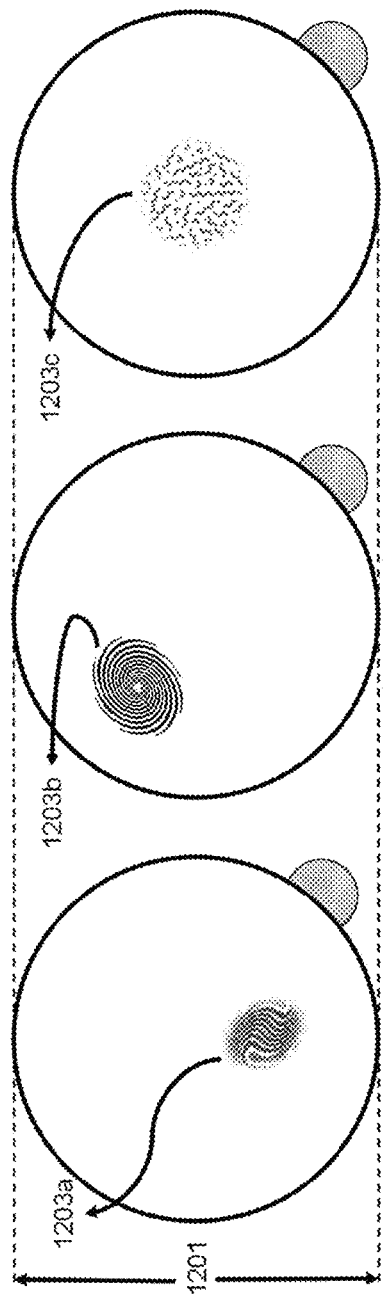
FIG. 12 illustrates the frontal view of three additional exemplary optical sheet or film embodiments (i.e., moiré pattern, curvilinear pattern, Memphis pattern), not to scale, as disclosed herein.

FIG. 12 shows the frontal view of three additional exemplary optical film or sheet embodiments, not to scale, with an optical film diameter of 1201. The frontal view of the three exemplary optical film or sheet embodiments illustrates the three contemplated non-refractive design features (1203a, 1203b, and 1203c). In this example, the non-refractive design feature (1203a) is a representative example of the contemplated moiré pattern, which is configured away from the geometrical centre of the optical film or sheet embodiment.

The non-refractive design feature (1203b) illustrates another representation of the contemplated curvilinear pattern across the optical film; which assumes a spiral pattern. The non-refractive design features (1203c) illustrate a Memphis pattern centred about the geometrical centre of the optical film or sheet. The width of the design features range between 5 to 150 µm, the substantially opaque features in the figure are highlighted to demonstrate the features relative to the size of the optical film or sheet described herein. In yet another optical film or sheet embodiment, the designed feature (i.e., a plurality of non-refractive striations or moiré pattern) may be contained within the central 1, 5, 10, 15, 20 or 25 mm of the optical film. In yet another optical film or sheet embodiment, the design feature (i.e., plurality of non-refractive striations or moiré pattern) may be contained between the central 1 mm and 5 mm, or the central 5 mm to 10 mm, or the central 1 mm to 15 mm or the central 5 mm to 25 mm of the optical film or sheet. In yet another optical film or sheet embodiment the contemplated design features (i.e., a plurality of striations or moiré pattern) within the optical film may be separated from each other. In yet another embodiment, the contemplated plurality of non-refractive opaque features may be configured adjacent to or interlaced with each other. In certain optical film or sheet embodiments, the width of the contemplated design features (i.e., a plurality of striations or moiré pattern) within the optical film may be at least 5 µm, 10 µm, 20 µm, 30 µm, 40 µm or 50 µm in width. In certain optical film or sheet embodiments, the width of the contemplated design features within the optical film may be between 5 and 15 µm, 15 and 25 µm, or 10 and 50 µm in width. In some other embodiment, the border of the contemplated design features within the optical film may be opaque and yet in some other embodiments, the border of the contemplated design features may be translucent. In some embodiments, the width of the design feature may not be constant across a plurality of non-refractive opaque features.

Figure 13:
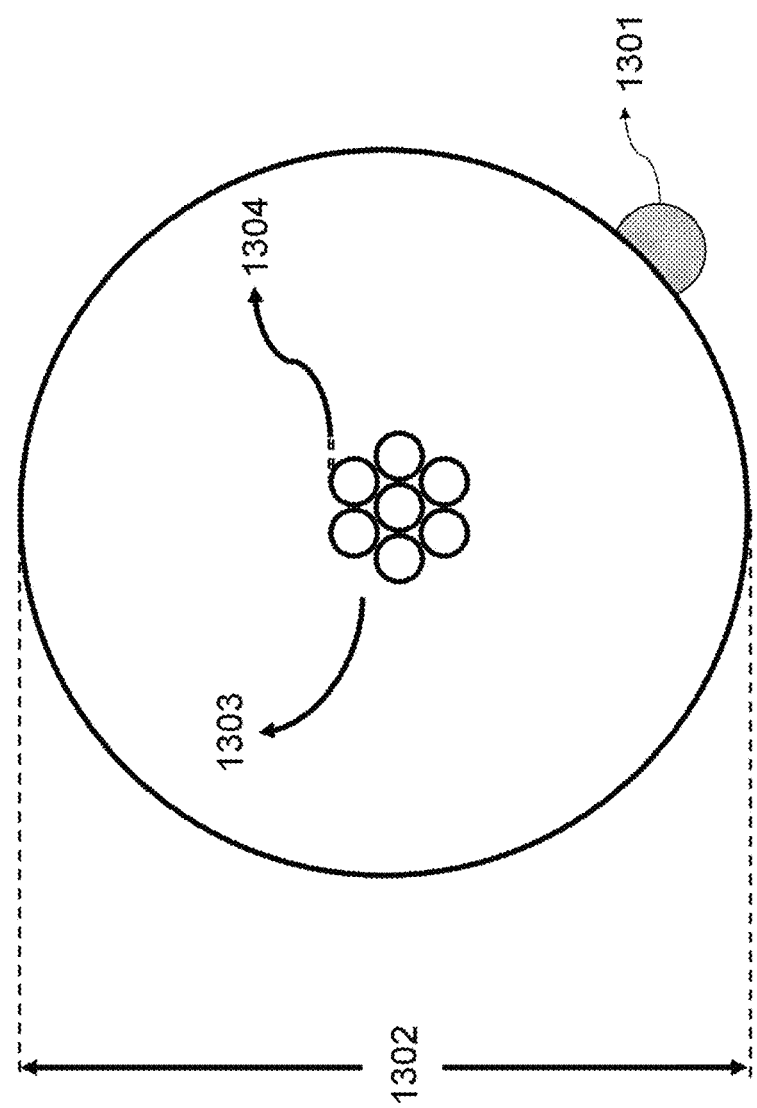
FIG. 13 illustrates the frontal view of an exemplary optical sheet or film embodiment with non-refractive opaque features as multiple circular shaped connected apertures in a hexagonal arrangement, not to scale, as disclosed herein.

FIG. 13 shows the frontal view of the exemplary optical film or sheet, not to scale, with an optical film diameter (1302) and a plurality of non-refractive opaque features (1303) comprising conjoined circular shaped non-refractive opaque features. The total number of circular apertures is 7. The total dimension of the non-refractive opaque feature comprising multiple apertures is approximately 3.75 mm in diameter. The dimensions of each aperture are approximately 1.25 mm in diameter. The width of the border of each of the aperture is approximately 100 µm (1304). The non-refractive opaque features are magnified relative to other features of the optical film or sheet for identification and legibility. The remainder of the portion of the optical film devoid of the non-refractive opaque features of the exemplary embodiment is configured with plano power. The optical film may be peeled using the 1301 portion allowing it to be placed on the single vision spectacle.

Figure 14:
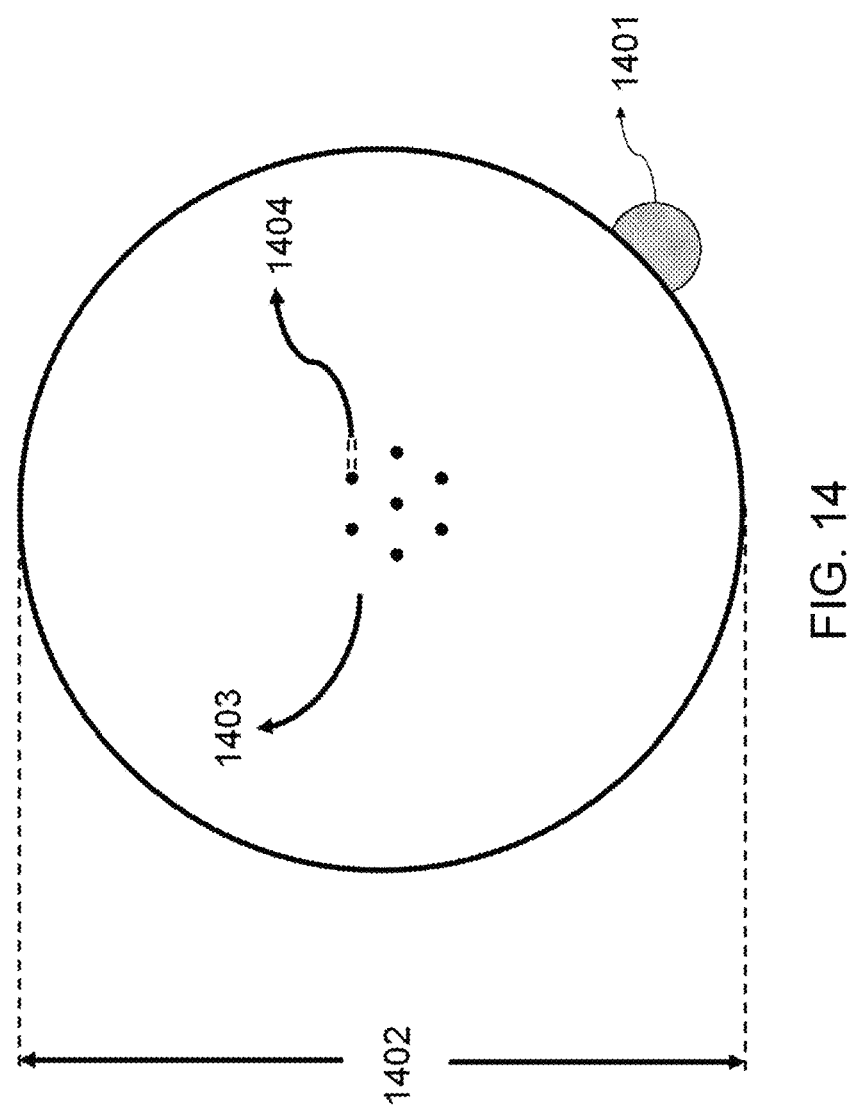
FIG. 14 illustrates the frontal view of an exemplary optical sheet or film embodiment with dot-like non-refractive opaque features in a hexagonal arrangement pattern, not to scale, as disclosed herein.
Figure 15:
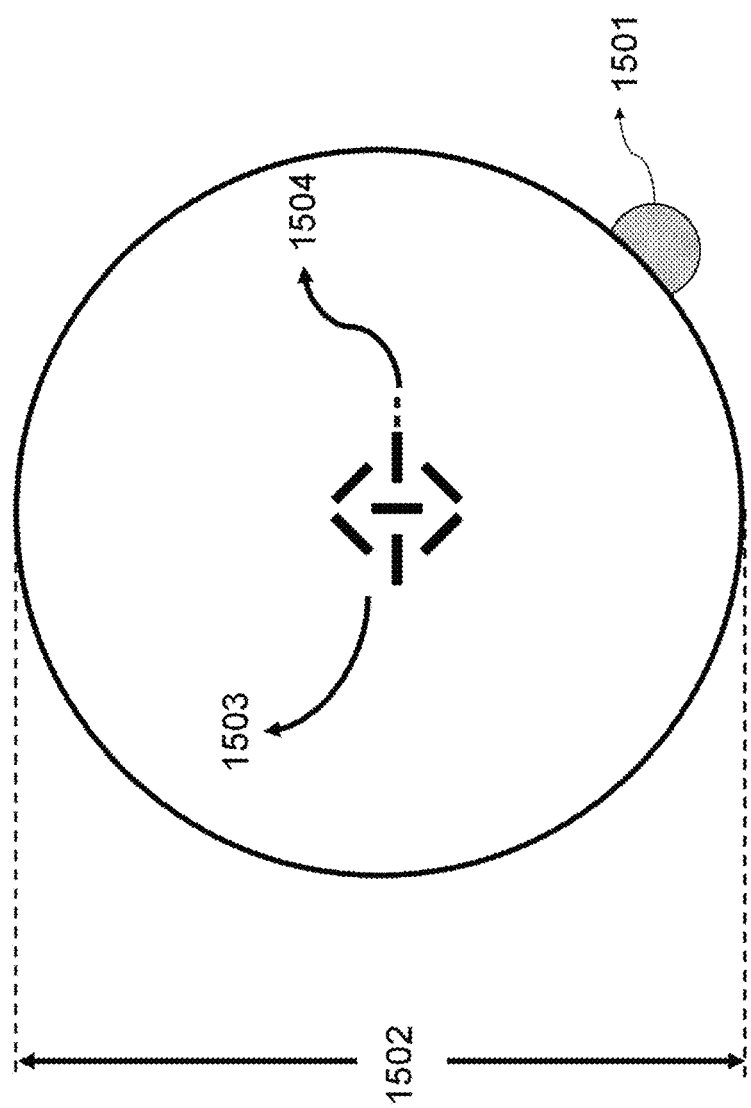
FIG. 15 illustrates the frontal view of an exemplary optical sheet or film embodiment with bars as non-refractive opaque features in a random arrangement, not to scale, as disclosed herein.

FIG. 14 shows the frontal view of the exemplary i optical film or sheet, not to scale, with an optical film diameter (1402) and a plurality of non-refractive opaque features (1403) comprising a pattern of dots (1403), including a plurality of dots arranged in a hexagonal arrangement. The total number of dots is 7. The total dimensions of each dot patterns is approximately 4 mm in diameter. The dimensions of each dot in the dot pattern is approximately 200 µm (1404). The non-refractive opaque features are magnified relative to other features of the optical film or sheet for identification and legibility. The remainder of the portion of the optical film devoid of the non-refractive opaque features of the exemplary embodiment is configured with plano power. The optical film may be peeled using the 1401 portion allowing it to be placed on the single vision spectacle. FIG. 15 shows the frontal view of the exemplary optical film or sheet, not to scale, with an optical film diameter (1502) and a plurality of non-refractive opaque features (1503) comprising a random pattern of bars or thickened lines (1503), including a plurality of bars. The total number of bars is 7. The total dimensions of the random pattern of bars is approximately 4 mm in diameter. The dimensions of each bar in the random bar pattern is approximately between 50 µm×1.25 mm (1504). The non-refractive opaque features are magnified relative to other features of the optical film or sheet for identification and legibility. The remainder of the portion of the optical film devoid of the non-refractive opaque features of the exemplary embodiment is configured with plano power. The optical film may be peeled using the 1501 portion allowing it to be placed on the single vision spectacle.

Figure 16:
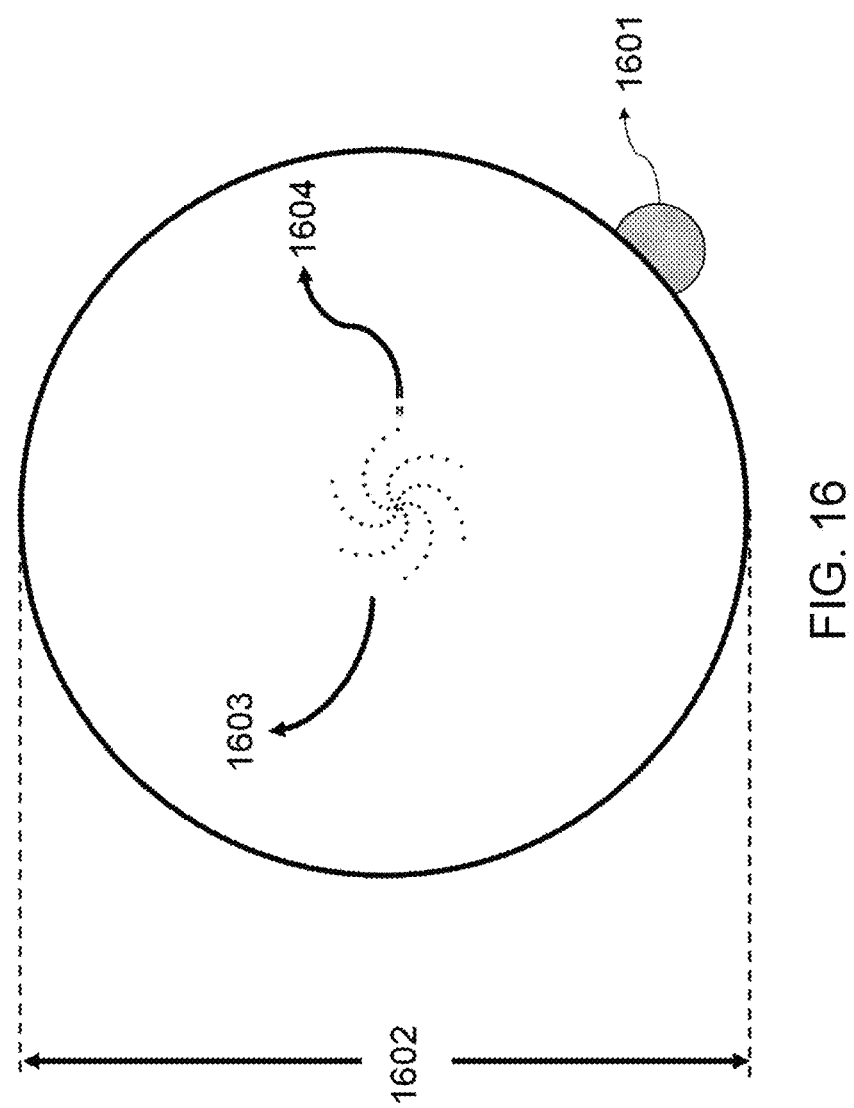
FIG. 16 illustrates the frontal view of an exemplary optical sheet or film embodiment with dot-like non-refractive opaque features in a spiral arrangement, not to scale, as disclosed herein.

FIG. 16 shows the frontal view of the exemplary optical film or sheet, not to scale, with an optical film diameter (1602) and a plurality of dot-like non-refractive opaque features (1603) arranged in a spiral pattern. The total number of spiral arms is 6. The total dimensions of the spiral pattern is approximately 6 mm in diameter. The dimensions of each dot within the spiral pattern is approximately between 50 µm (1604). The non-refractive opaque features are magnified relative to other features of the optical film or sheet for identification and legibility. The remainder of the portion of the optical film devoid of the non-refractive opaque features of the exemplary embodiment is configured with plano power. The optical film may be peeled using the 1601 portion allowing it to be placed on the single vision spectacle.

Figure 17:
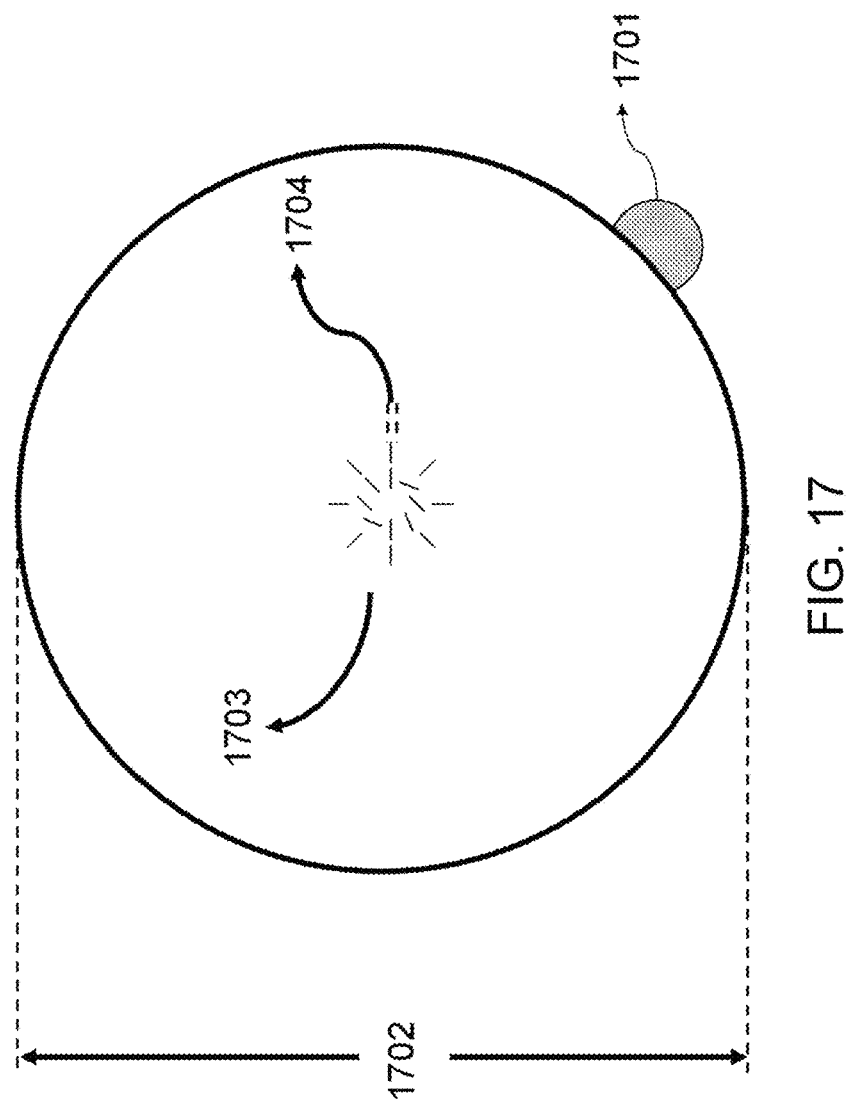
FIG. 17 illustrates the frontal view of an exemplary optical sheet or film embodiment with striae as non-refractive opaque features in a random arrangement, not to scale, as disclosed herein.

FIG. 17 shows the frontal view of the exemplary optical film or sheet, not to scale, with an optical film diameter (1702) and a plurality of striae-like non-refractive opaque features (1703) arranged in a random pattern. The total dimensions of the pattern is approximately 5 mm in diameter. The dimensions of each striae within the random pattern is approximately between 50 µm (1704).

Figure 18:
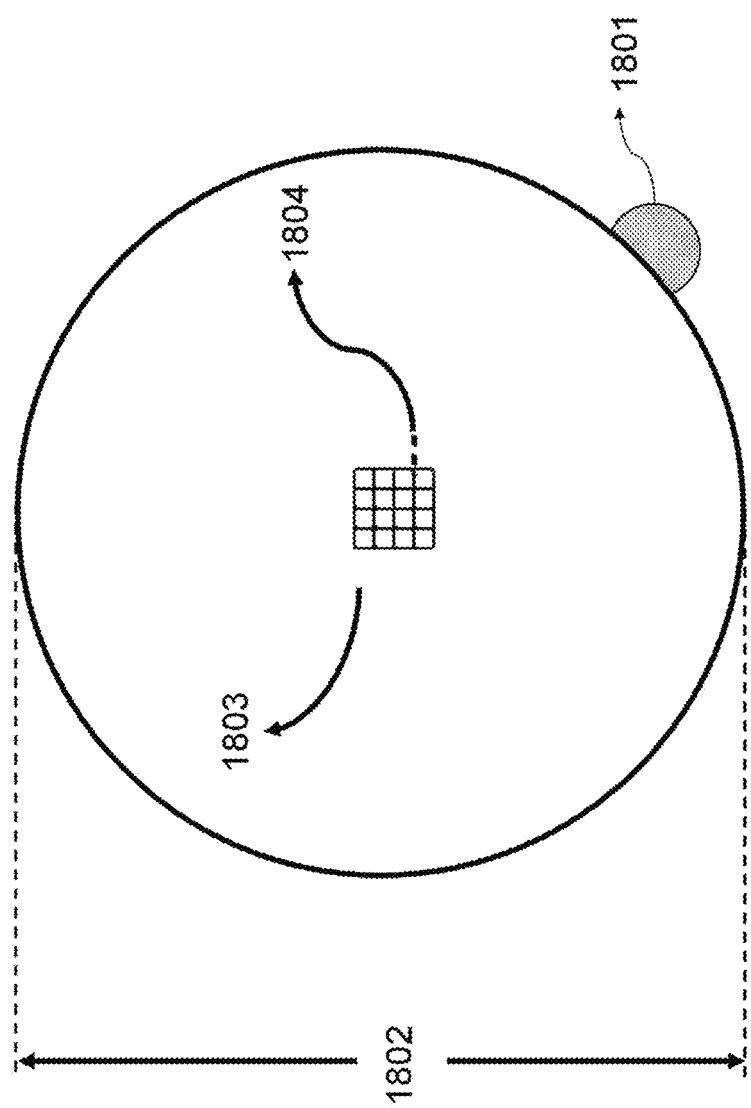
FIG. 18 illustrates the frontal view of an exemplary optical sheet or film embodiment with lines as non-refractive opaque features in a square-grid pattern arrangement, not to scale, as disclosed herein.

The non-refractive opaque features are magnified relative to other features of the optical film or sheet for identification and legibility. The remainder of the portion of the optical film devoid of the non-refractive opaque features of the exemplary embodiment is configured with substantially plano power, or substantially no optical power. The optical film may be peeled using the 1701 portion allowing it to be placed on the single vision spectacle. FIG. 18 shows the frontal view of the exemplary optical film or sheet, not to scale, with an optical film diameter (1802) and a plurality of square apertures as non-refractive opaque features (1803) arranged in a square-grid pattern. The total number of apertures designed within the pattern (1803) is approximately 16. The total dimensions of the pattern is approximately 3×3 mm in diameter. The width of the lines, or border forming of the square aperture is approximately between 50 µm (1804). The non-refractive opaque features are magnified relative to other features of the optical film or sheet for identification and legibility. The remainder of the portion of the optical film devoid of the non-refractive opaque features of the exemplary embodiment is configured with plano power. The optical film may be peeled using the 1801 portion allowing it to be placed on the single vision spectacle.

Figure 19:
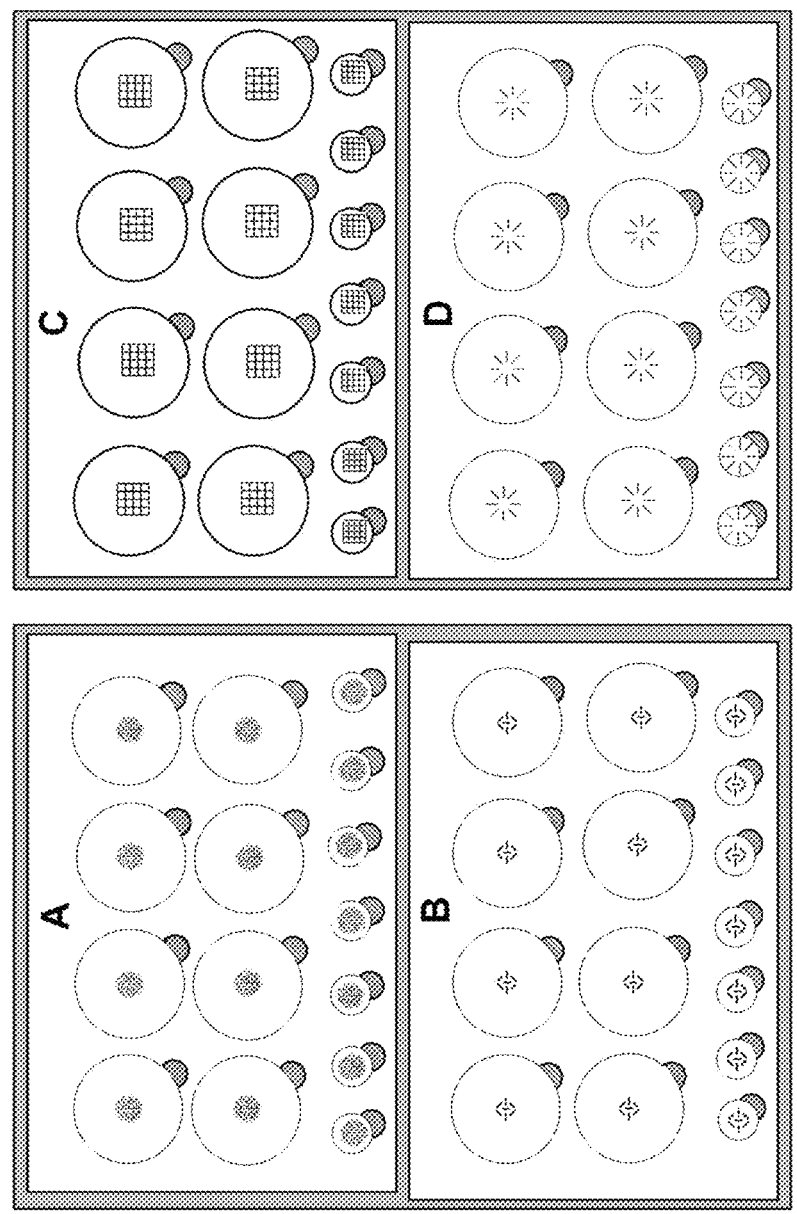
FIG. 19 illustrates an array of ready-made optical sheets or films enclosed in multiple subsets, arranged in a set or kit, as disclosed herein which are suitable for use over the regional surface area of a standard pair of single vision spectacles described in FIG. 7.

FIG. 19 illustrates an array of optical sheets or films with different non-refractive opaque features enclosed in multiple subsets within a kit. For example, the Set A of FIG. 19 comprises of numerous circular optical films, wherein each film is configured with a Memphis pattern as described in FIG. 1203c. The optical films in Set B, C and D have non-refractive opaque features as described in FIGS. 15, 18 and 10, respectively. The optical films in each set vary between 3 mm and 30 mm diameter. In some examples, the optical film may have a surface area that is at least 200 square mm, 400 square mm, 800 square mm, 1200 square mm, 1600 square mm, 2400 square mm, or 2800 square mm. In some other examples, the optical film may have a surface area that is at least 20 square mm, 50 square mm, 75 square mm, 100 square mm, or 150 square mm.

Figure 20:
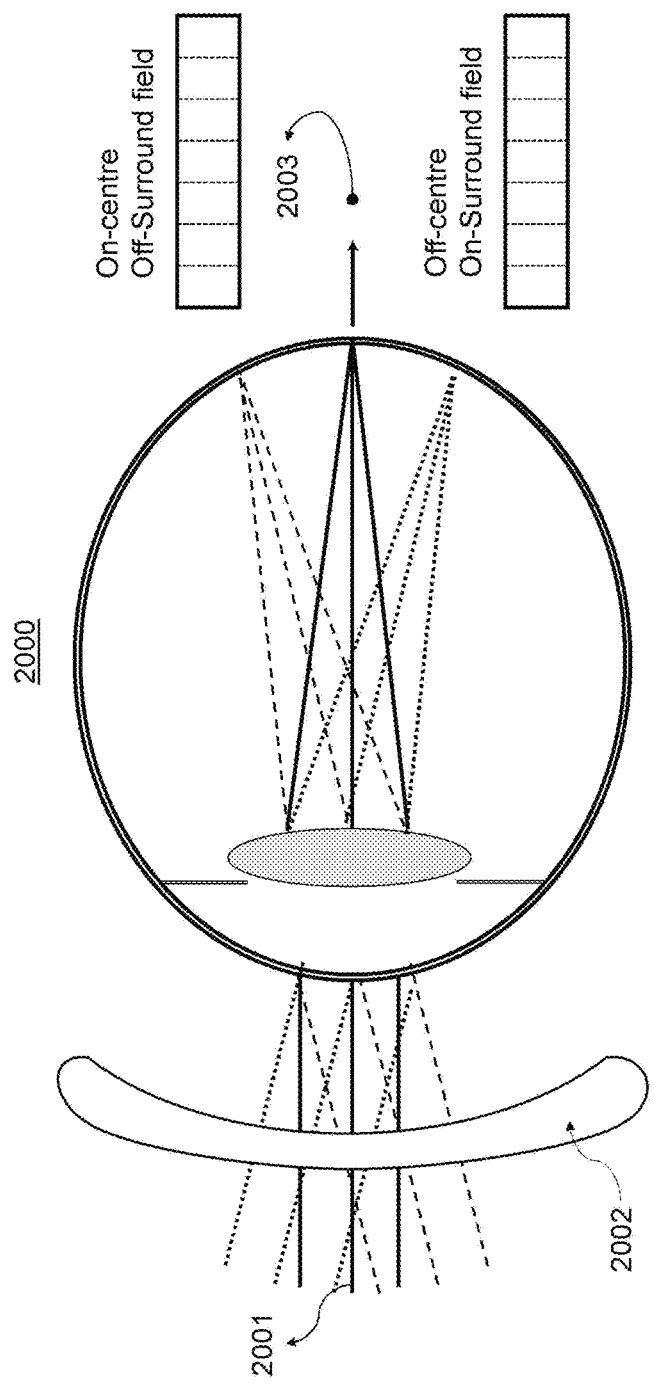
FIG. 20 illustrates a schematic diagram of the theoretical retinal ganglion cell activity recorded by the on-centre/off-surround and off-centre/on-surround retinal circuitry, when the incoming light, with a visible wavelength (for example, 555 nm) and a vergence of 0 D, is incident on a –1 D myopic model eye, which is corrected with a single vision spectacle lens of the prior art.

FIG. 20 shows the schematic diagram depicting incoming light, of a visible wavelength, for example, 555 nm, with a vergence 0 D, from a wide-angle field of view (2001)

entering a −3 D myopic model eye (2000), which is corrected with a standard single vision lens of prior art (1702). The retinal ganglion cell activity recorded by the on-centre/off-surround and off-centre/on-surround circuitry (2003), when the eye moves behind the standard single vision lens of prior art (2002), demonstrates, or shows minimal retinal activity or retinal activity at a basal rate. The relative difference in the temporal integration of on- and off-receptive field activity determines further eye growth. The present disclosure postulates that an inactive retina triggers eye growth and an active retina reduces the growth or triggers a stop signal. The present disclosure further contemplates that a standard single vision spectacle lens of the prior art and/or a spatially homogenous visual imagery contributes to a homogeneous and substantially edge-less visual imagery leaving the retina in a baseline state (i.e., baseline or constant firing pattern of the retinal ganglion cells) and thus promoting further eye growth leading to more myopia.

Figure 21:
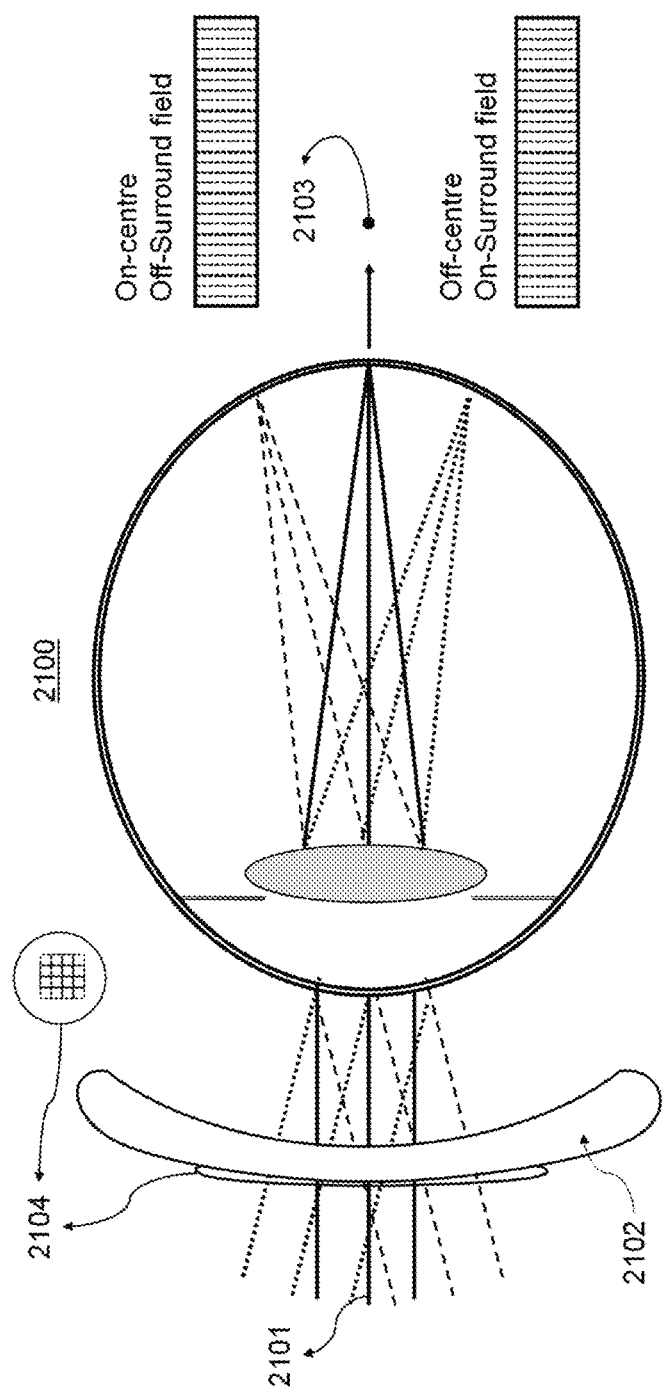
FIG. 21 illustrates a schematic diagram of the theoretical ganglion cell activity recorded by the on-centre/off-surround and off-centre/on-surround retinal circuitry, when the incoming light, with a visible wavelength (for example, 555 nm) and a vergence of 0 D, is incident on a –1 D myopic model eye, which is corrected with a single vision spectacle lens with one of the optical sheet or film embodiments comprising non-refractive opaque features as described in FIG. 18.

FIG. 21 shows the schematic diagram depicting an incoming bundle of light, of a visible wavelength, for example 555 nm, with a vergence 0 D, from a wide-angle field of view (2101) entering a −3 D myopic model eye (2100), corrected with one of the exemplary optical film or sheet embodiments (1804) used in conjunction with a standard single vision spectacle lens (2102) as disclosed herein.

The non-refractive opaque features within the optical film are configured as a square-grid pattern, as described in FIG. 18. The retinal ganglion cell activity recorded by the on-centre/off-surround and off-centre/on-surround circuitry (2103), when the eye moves behind the exemplary embodiment (2104) located on the standard single vision spectacle lens (2102), demonstrates, or shows increased activity at the retina compared to the baseline state. A simple model eye was chosen for illustrative purposes in FIGS. 20 and 21, However, in other embodiments, schematic raytracing model eyes like Liou-Brennan, Escudero-Navarro and others may be used instead. The examples provided herein have used a −1 D myopic model eye to disclose the present invention, however the same disclosure can be extended to other degrees of myopia, i.e., −2 D, −3 D, −5 D or −6 D. Further, it is understood that one can draw extensions to eyes with varying degrees of myopia in conjunction with astigmatism. In the embodiments, reference was made to a specific wavelength of 555 nm, however it is understood that one can draw extensions to other visible wavelengths between 420 nm and 760 nm. Modelling of various exemplary optical film or sheet embodiments used in conjunction with standard single vision spectacle lenses demonstrate that the contemplated non-refractive opaque features provide an increase in the retinal ganglion cell activity, gauged by the increase in the average retinal spike rate obtained using the virtual retinal platform disclosed herein. In other embodiments, various other surrogate measures of retinal ganglion cell activity may be considered, for example, inspection of the spike train analysis for the neuronal bundle of choice.

Schematic Eyes & Simulated Retinal Images

Advanced schematic model eyes may be used for computing wide-field simulated retinal images and wide-field optical performance of one or more of the exemplary embodiments disclosed herein. The generic prescription of the schematic model eye used for obtaining the retinal images serving as input to the virtual retinal platform used to simulate the workings for embodiments of the present disclosure is provided in the following Table 1. The described parameters in Table 1 are not necessary to demonstrate the described effects obtained with the embodiments of the present disclosure. This should be considered as one of many methods of obtaining retinal images to facilitate the emulation of the retinal processing performed by the virtual retina platform described herein.

The generic parameters of the schematic model eyes used are based on the prescription tabulated in the Table 1. In this example, the generic prescription of Table 1 offers the schematic model eye with a distance refractive error with −1 D of myopia without any astigmatism (Rx:−1 D), configured during 1 D of accommodation in its unaccommodated state, wherein the distance prescription of the model eye was defined at a 6 mm pupil diameter and a primary wavelength of 589 nm.

TABLE 1

Prescription of a schematic myopic model eye with a distance refraction prescription of −1 D and during 1 D of accommodation.

| Surface Type | Notes | Radius (mm) | Thickness (mm) | Refractive-Index | Semi Diameter (mm) | Conic Const |
| --- | --- | --- | --- | --- | --- | --- |
| Standard | Start | Infinity | 5 | | 4 | 0 |
| Standard | Anterior Cornea | 7.75 | 0.55 | 1.376 | 5.75 | −0.25 |
| Standard | Posterior Cornea | 6.4 | 3 | 1.334 | 5.5 | −0.4 |
| Standard | Pupil | Infinity | 0.45 | 1.334 | 5 | 0 |
| Standard | Anterior Lens | 9.34 | 3.8 | 1.423 | 4.5 | −3.2 |
| Standard | Posterior Lens | −6.25 | 16.92 | 1.334 | 4.5 | −4.101 |
| Standard | Retina | −12 | 0 | | 10 | 0 |

Figure 22:
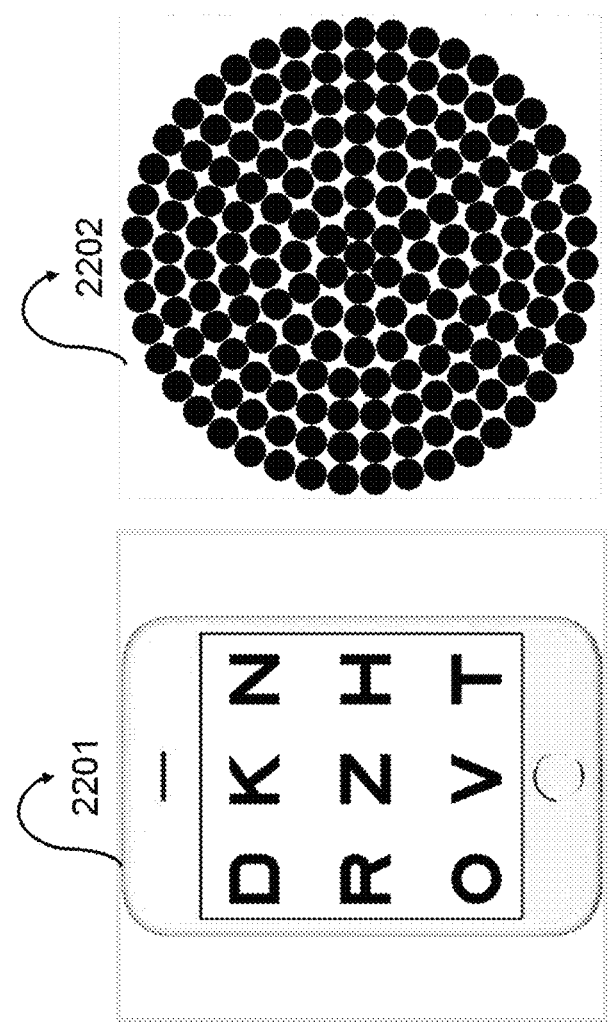
FIG. 22 represents the source image file of a wide-field visual scene (image of a mobile phone held at near viewing distance) projected onto the retina of a wide-angle schematic eye using non-linear projection routines; wherein the virtual retina is modelled with neuron bundles arranged in a circular pattern.
Figure 23:
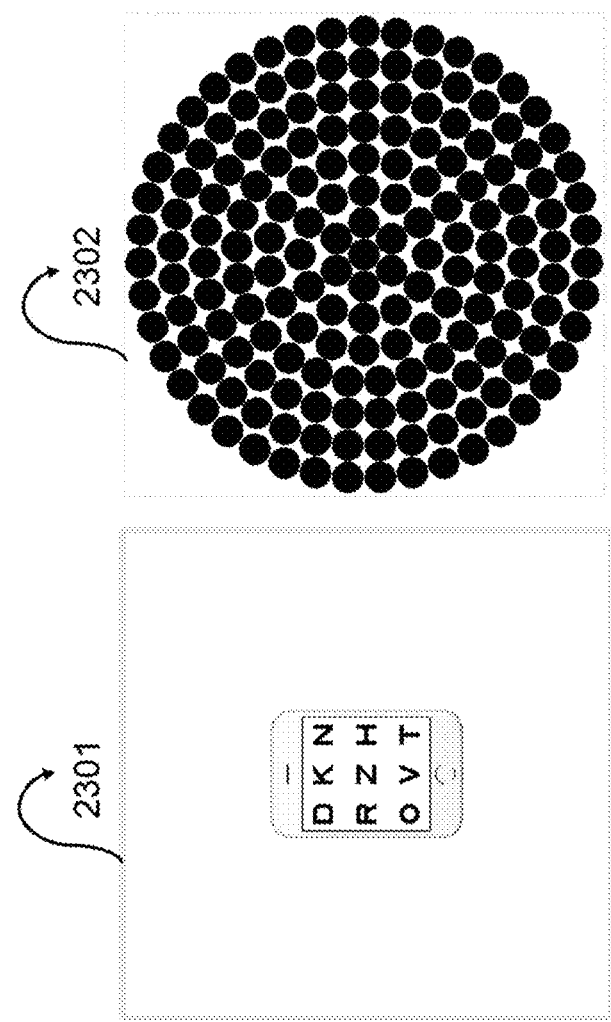
FIG. 23 represents the source image file of a wide-field visual scene (image of a mobile phone held at intermediate distance) projected onto the retina of a wide-angle schematic eye using non-linear projection routines; wherein the virtual retina is modelled with neuron bundles arranged in a circular pattern.
Figure 24:
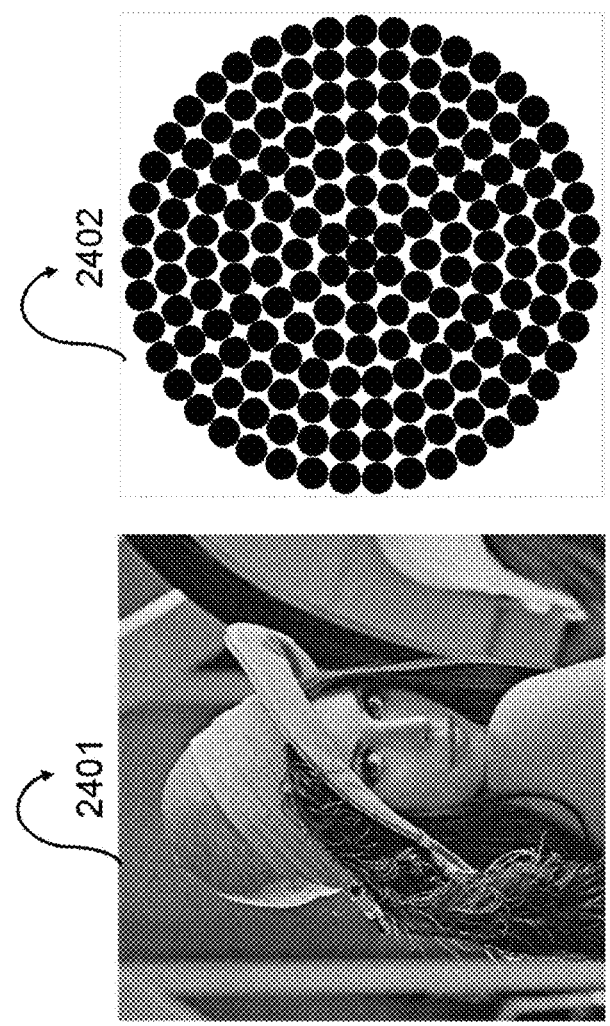
FIG. 24 represents the source image file of a wide-field visual scene (a Lenna standard image) projected onto the retina of a wide-angle schematic eye using non-linear projection routines; wherein the virtual retina is modelled with neuron bundles arranged in a circular pattern.

In the various other example embodiments disclosed herein, various modifications may be considered to evaluate the performance of other optical film or sheet embodiments described herein. Furthermore, the individual parameters of the schematic model eyes, for example, anterior cornea, posterior cornea, corneal thickness, anterior lens, posterior lens, lens thickness, refractive index of the ocular media, retinal curvature, or combination thereof, may be altered to demonstrate the workings of the present disclosure in various levels of myopia with or without astigmatism, and for the modelling of various myopic eyes in their relaxed and accommodative states. To obtain the wide-field simulated retinal images using the schematic model eyes when fitted with embodiments of the present disclosure, the source image files were convolved with an array of point spread functions spanning a desired field of view, considering the non-linear projection of the visual scene into a wide-angle schematic eye, as disclosed herein. Three source image files (2201, 2301 and 2401) of visual scenes used to describe the workings of the embodiments are showcased in FIGS. 22, 23 and 24.

The virtual retina is modelled with neuron bundles arranged in a circular pattern (2202, 2302 and 2402). The first image (2201) represents a mobile phone screen display against a white background screen, wherein the angular subtense of the source scene was configured to capture a 15 degree visual field at a 50 cm viewing distance. The second image (2301) represents a mobile phone screen display against a white background screen, wherein the angular subtense of the source scene was configured to capture 15° of the visual field at a 1 meter viewing distance. The third source image (2401) shows an 8-bit grayscale Lenna image configured to subtend 5 degree at a 6 metre viewing distance. In some other examples, the source image files of three visual scenes (2201, 2301 & 2401), may be configured to subtend 5, 10, 15 or 20° of the retinal field, to describe the performance of various embodiments disclosed herein. The array of point spread function is interpolated for every pixel in the modified image file. At each pixel, the effective point spread function was convolved with the modified source image file. To compute the point spread function at the desired field, Huygens's principle was adapted in the present disclosure, as the modelled effects of the relatively small non-refractive opaque features may be compromised by the Fourier estimations that are often used for increased computational efficiency.

The computation of the array of point spread functions across the desired field of view includes the effects of diffraction and aberrations. The resulting simulated retinal image is scaled and stretched to account for the detected distortion levels. The brightness of the simulated retinal image is determined by normalizing the intermediate output image to have the same peak brightness as the input source image considered for the convolution operation disclosed herein.

In various embodiments of the present disclosure, the settings of various parameters needed for simulation of virtual retinal images were altered to capture various real-life scenarios that may be experienced by an individual. In certain embodiments, as the accuracy of the retinal image simulation is limited by the resolution of the input source image, due care was borne to at least maintain an input image resolution of 512×512 pixels to avoid apparent pixel discretisation of the output image often manifested by aliasing effects, and further, wherever necessary oversampling of the input source was considered to minimise such effects at the expense of relatively longer computation time.

Control Single Vision Spectacle Lens and Exemplary Embodiment Design

The left optical film embodiment used in conjunction with a standard single vision spectacle lens as shown in FIG. 7 was modelled to demonstrate that the non-refractive opaque features in the optical film, provide an increase in the retinal ganglion cell activity when compared to the right lens that has no optical film with non-refractive opaque features. Specifically, the non-refractive opaque features within the optical film comprises a square-grid pattern as described in FIGS. 18 and 21.

In this example, the schematic model eye of Table 1 was configured to focus on an object at 1 metre distance from the eye. The myopic schematic model eye was corrected, one at a time, with the standard single vision spectacle lens and the exemplary optical film embodiment used in conjunction with the standard single vision spectacle lens. The standard single vision lens was modelled using the following parameters: front surface (R=2000 mm), a centre thickness (1.5 mm), a back surface (R=379.1 mm) and refractive index of 1.5 with a total blank diameter of 50 mm. The standard single vision spectacle lens is free/devoid of any non-refractive opaque features.

The second lens represents the exemplary embodiment which is also a single vision spectacle lens with same parameters as the previous lens, that was further configured with square-grid non-refractive opaque features disclosed in FIG. 18. The non-refractive opaque features of the exemplary embodiment example comprises a square-grid pattern (1803) which further comprises a plurality of square apertures, positioned about the optical centre of the optical film (FIG. 18). The total number of apertures designed within the pattern (1803) is approximately 16. The total dimensions of the square-grid is approximately 3×3 mm. The width of the lines, or border forming of the square aperture is approximately between 50 μm (1804). The remainder of the portion of the exemplary embodiment is configured with plano power. The non-refractive opaque features of the exemplary embodiment example is configured to such that it absorbs at least 85% of light incident on the non-refractive opaque feature.

The simulated retinal images were computed and analysed with the control, i.e., the standard single vision lens without non-refractive opaque features, and embodiment, i.e., the standard single vision lens with the optical film that comprises the square-grid pattern non-refractive opaque features, when fitted on the schematic model eye of Table 1, following the steps disclosed above.

In this Example, additional variables of the virtual retinal platform were contemplated with the following settings; the option of a contrast gain control mechanism, described in Equations 1, 5 and 6. The arrangement of the neuronal bundle was in a circular arrangement spanning 20°×20° field of view. A sparse lateral connectivity mode of the virtual retina was used with 10 pre-synaptic neurons with 10% of positive weight and a weight variance of 0.01. The supplementary high-pass filter option of outer plexiform layer, described in Equations 2 and 3, was muted. The post-synaptic pooling option was also muted. The postprocessing of the computed simulated retinal images of the control spectacle design, using the virtual retinal platform, as discussed herein, results in a spike train as a function of time (FIG. 25) and peri-stimulus histogram highlighting the average spike rate as a function of time (FIG. 26), for cells with both on-type and off-type polarities. The top and bottom sub-graphs of FIG. 25 and FIG. 26 represent data for on- and off-cells, respectively.

Figure 27:
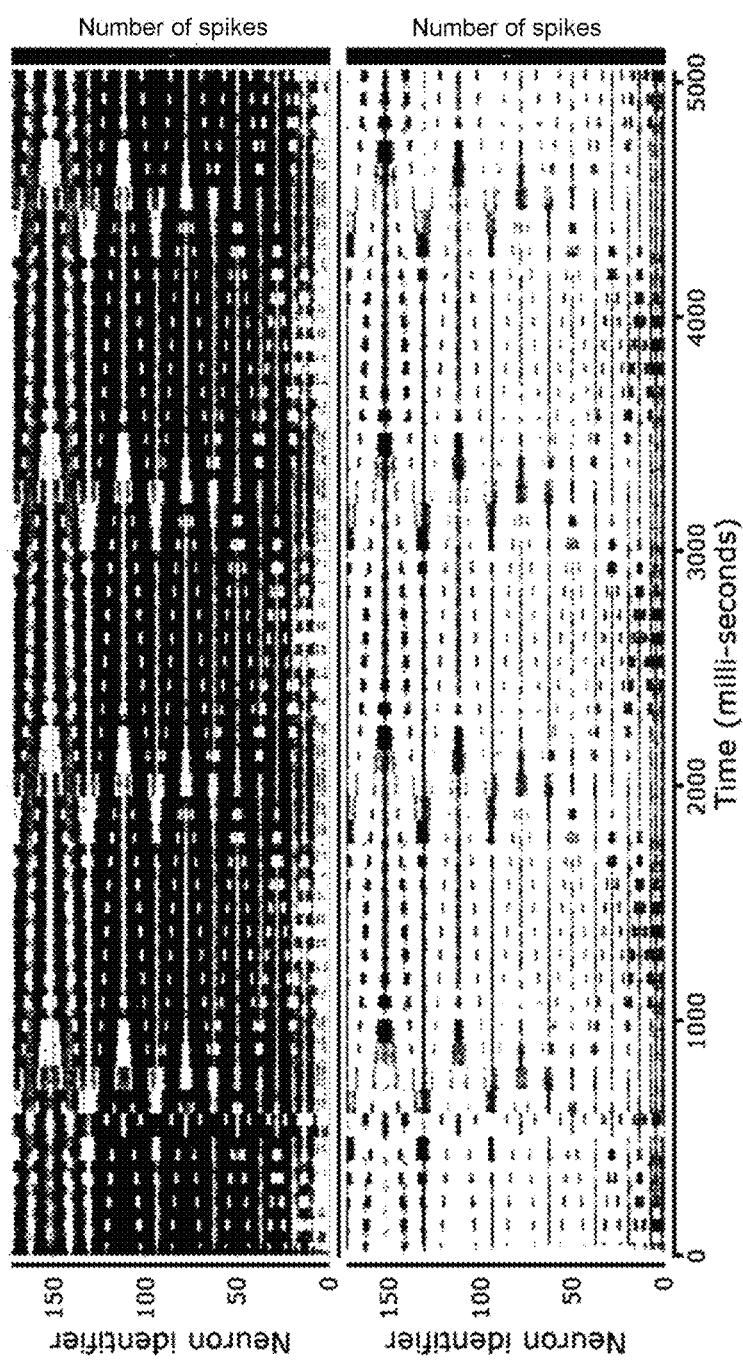
FIG. 27 illustrates the output spike trains obtained from on- and off-cell pathways of the virtual retinal model for the optical sheet or film embodiment, as described in FIG. 18, when used in conjunction with a standard single vision spectacle lens, as disclosed herein. The spike trains obtained from the on- and off-cells are represented as top and bottom sub-graphs. The Y-axis of the graph represents the discrete neuron bundles, and the X-axis represents time in milli-seconds. The dark portions of the graph represent spikes and white portions represent lack thereof.
Figure 28:
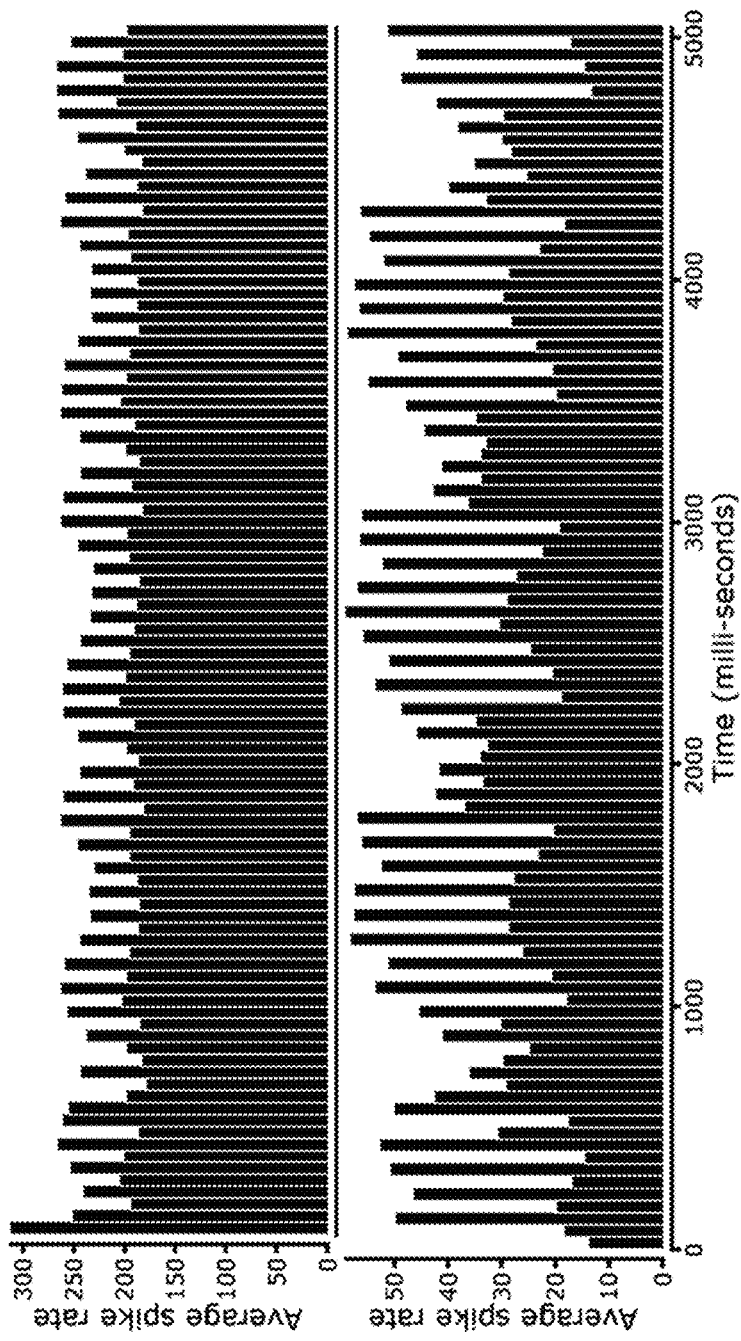
FIG. 28 showcases the average spike rate, as a function of time, from the on-cell (top) and off-cell (bottom) pathways of the virtual retinal model, obtained for the optical film or sheet embodiment when used in conjunction with a standard single vision spectacle lens, as described in FIGS. 18 and 21.

The postprocessing of the computed simulated retinal images of the optical film embodiment, using the virtual retinal platform, as discussed herein, results in a spike train as a function of time (FIG. 27) and peri-stimulus histogram highlighting the average spike rate as a function of time (FIG. 28) for cells with both on-type and off-type polarities. The top and bottom sub-graphs of FIG. 27 and FIG. 28 represent data for on-type and off-type cells, respectively.

Figure 25:
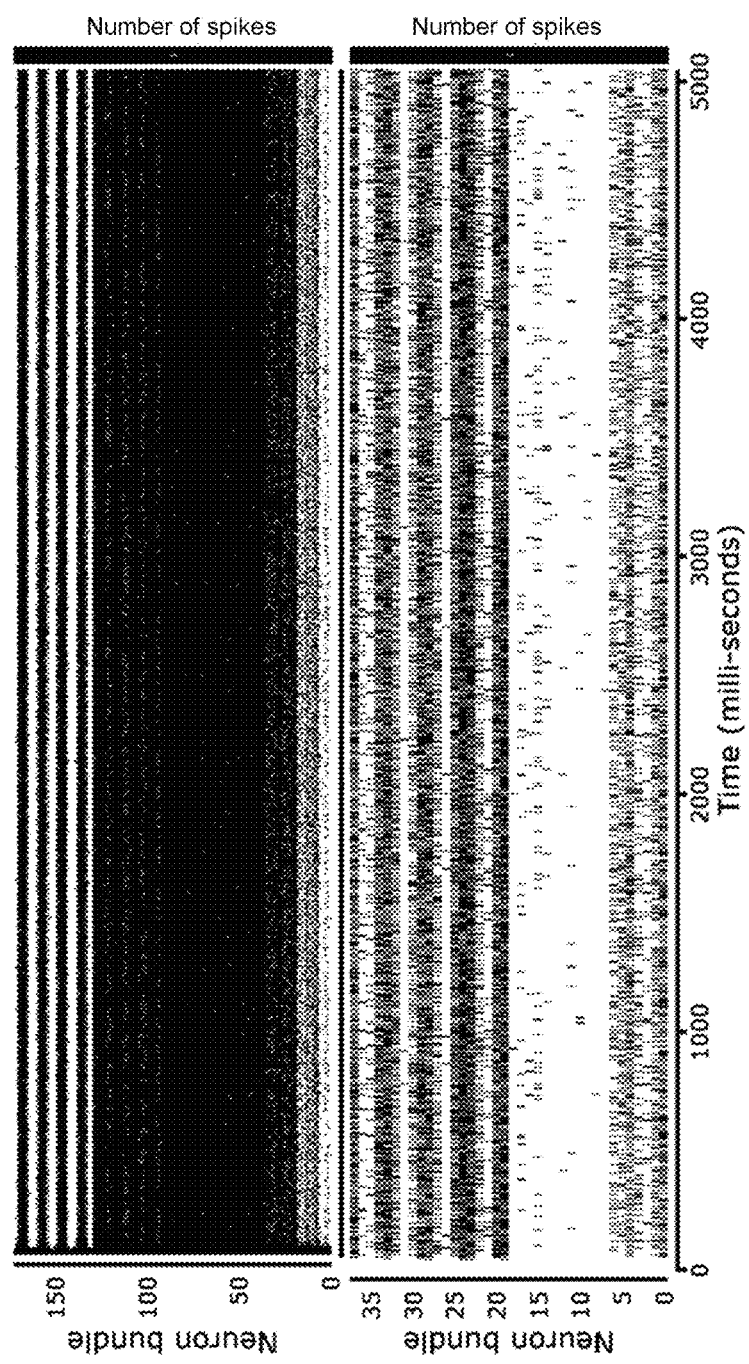
FIG. 25 illustrates the output spike trains obtained from on- and off-cell pathways of the virtual retinal model for the control spectacle lens. The spike trains obtained from the on- and off-cells are represented as top and bottom sub-graphs. The Y-axis of the graph represents the discrete neuron bundles, and the X-axis represents time in milli-seconds. The dark portions of the graph represent spikes and white portions represent lack thereof.
Figure 26:
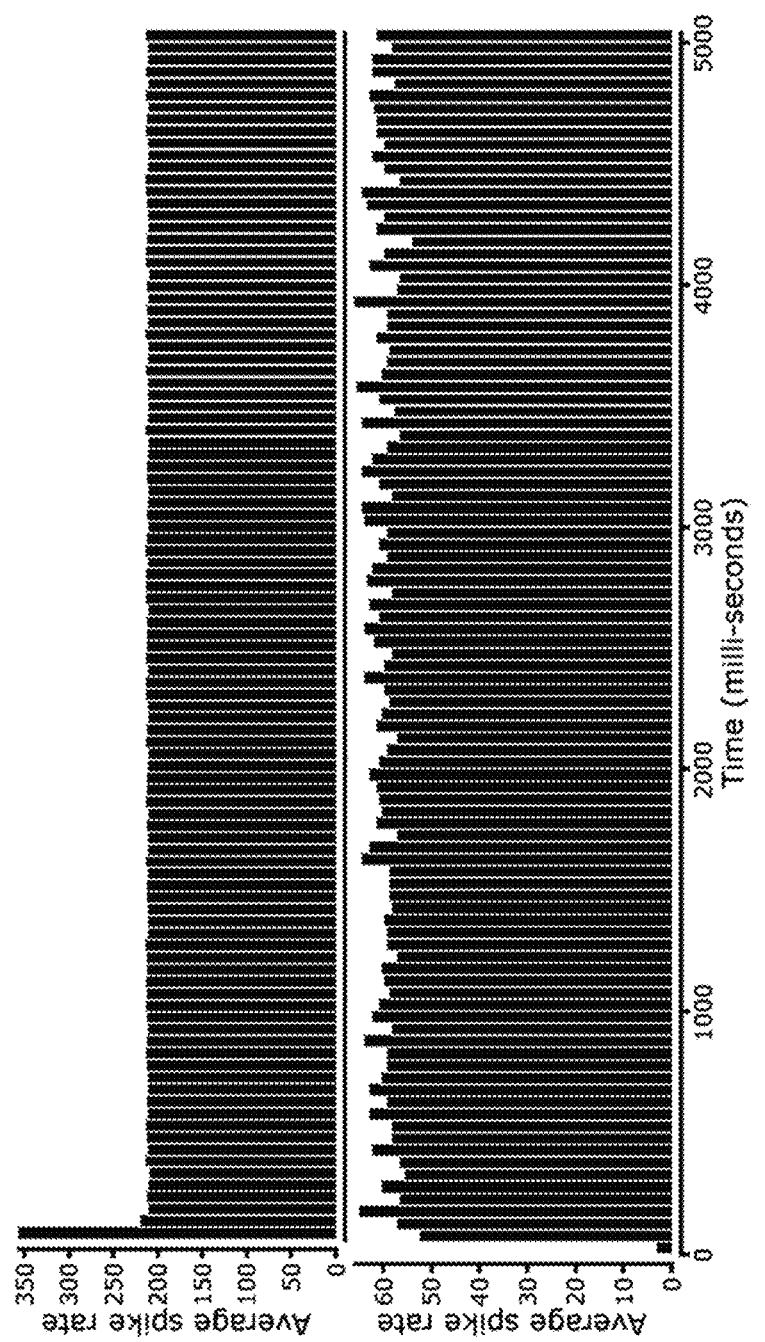
FIG. 26 showcases the average spike rate, as a function of time, from the on-cell (top) and off-cell (bottom) pathways of the virtual retinal model, obtained for the control spectacle lens.

The neuronal activity with the control spectacle lens, depicted as spike trains of FIG. 25, is relatively time invariant or with minimal variation or fluctuation as a function of time, for cells with both type of polarities, on- and off. On the other hand, the neuronal activity with the optical film embodiment spectacle lens, depicted as spike trains of FIG. 27, is relatively time variant and fluctuating with varying periodicity as a function of time. In this example, the neuronal activity with the control spectacle lens, depicted as average spike rate of FIG. 26, follows a relatively monotonous profile following the initial 50 milliseconds, signifying stabilisation of the signal. This observed pattern is similar for cells with both type of polarities, on-type, and off-type. The off-type cell response did show some variability of the average spike rate as a function of time; however, the magnitude of the change were small. On the other hand, the neuronal activity with the optical film embodiment spectacle lens, depicted as the average spike rate as function of time, described in FIG. 28, obtained with the optical film embodiment follows a time-variant pattern for both on-type and off-type cells. The neuronal activity with the control spectacle lens, depicted as spike trains of FIG. 25, is relatively time invariant, for both type of polarities. The non-stationarity and nonlinearity in the spiking responses obtained with the embodiment lens is attributed to the artificial edges, or luminous contrast profiles, in the retinal imagery, or temporal variation of the artificial edges.

As can be seen from the responses of discrete neuronal bundles, the number of active discrete off-type neuron bundles are 3 to 4 times lower in number than the corresponding active discrete on-type neuron bundles. On the other hand, the neuronal activity with the optical film embodiment, depicted as spike trains of FIG. 27, is relatively time variant for both type of polarities. Further, the total number of active off-type discrete neuron bundles were comparable to the number of active on-type discrete neuron bundles.

Figure 29:
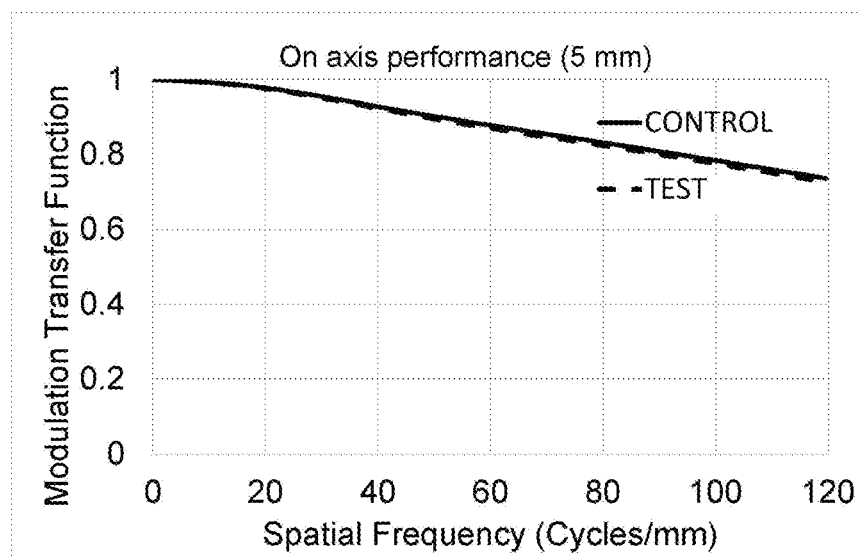
FIG. 29 showcases the on-axis modulation transfer function of the control spectacle lens and the optical film or sheet embodiment when used in conjunction with a standard single vision spectacle lens, as described in FIGS. 18 and 21, evaluated at a 6 mm pupil diameter.
Figure 30:
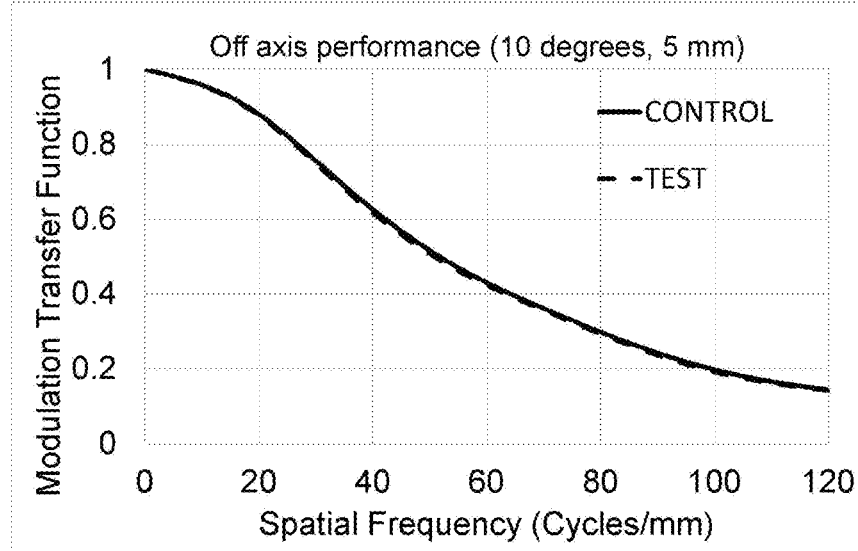
FIG. 30 showcases the off-axis modulation transfer function of the control spectacle lens and the optical film or sheet embodiment when used in conjunction with a standard single vision spectacle lens, as described in FIGS. 18 and 21, evaluated at a field angle of 10 degree and a 6 mm pupil diameter.

In this example, the on- and off-axis evaluation of the optical performance, was modelled in monochromatic mode (589 nm) and at 5 mm pupil analysis diameter. As described herein FIGS. 29 and 30, the wide-field optical performance, as gauged using modulation transfer function as function of spatial frequencies, at 5 mm pupil diameter, between the control and exemplary optical film embodiment spectacle lenses is virtually indistinguishable. For the off-axis performance, in this example, the field of view considered for evaluation of performance was 20°, which is ±10° from the centre.

Another method of use of the optical films in conjunction with wearer's own spectacle lenses is described herein. For example, a predetermined set of locations on the wearers own spectacle lenses may be traced and defined by an eye care practitioner, or an optical dispenser, or any other trained professional, to facilitate the wearer to change the location of the optical film as per the care regimen. In some examples, a specific or prescribed location for the optical film to be adhered on the spectacle lens may be defined using laser engravings in form of a dot, line, or a cross-shaped pattern. In some examples, the method of prescribing the set or kit includes the wearer to stick or adhere the optical film to the specified region of the spectacle lens. In some examples, the choice of the predetermined set of locations on the wearer's own spectacle lenses may be ascertained by considering various patient related factors, for example the magnitude of myopia, the onset of myopia, parental myopia, age, gender, and other risk factors generally associated with progression of myopia or high myopia.

For example, the optical films or sheets may be cut, or punched out, to substantially match the traced shape of their spectacle frame or lenses, in accordance with the current disclosure. In other examples, the shape of the optical film may not be determined by traced shape of the spectacle frame or lens of the wearer. Instead, a predetermined shape, for example circular, oval or any other regular or irregular shape may be used, as disclosed herein. The individually tailored optical films or sheets may be dispensed in a form of a set or a kit that including various permutations and combination of shapes, designs and locations of one or more non-refractive opaque features configured within the optical film or sheet, as described in FIGS. 19 to 22.

Certain methods of the disclosure include a care regimen to provide temporal and spatial variation to the optical stop signals; such that the efficacy to reduce the progression of eye growth remains substantially consistent over time. In certain other embodiments, the standard single vision spectacles include substantially spherical single vision spectacle lenses for correction of myopia without astigmatism, or substantially astigmatic/toric single vision spectacle for correction of myopia with astigmatism.

As a person skilled in the art may appreciate, the present invention may be used in combination with any of the devices/methods that have the potential to influence the progression of myopia. These may include but are not limited to, spectacle lenses of various designs, colour filters, pharmaceutical agents, or behavioural changes.

The invention claimed is:

1. An optical film comprising a refractive region with substantially plano power and a non-refractive region, the non-refractive region comprises a plurality of non-refractive opaque features;
   wherein each of the plurality of non-refractive opaque features is at least configured as a dot, a straight line, an arc, a zig-zag line, or a striae;
   wherein the optical film is configured in conjunction with a standard single vision spectacle lens for a myopic eye, the spectacle lens comprising an optical centre, a front and a back surface forming a base prescription that provides a substantial correction for the distance refractive error of the myopic eye;
   wherein the non-refractive region provides an active rise in overall retinal ganglion cell activity of the myopic eye to provide at least one of slowing, retarding, or preventing myopia progression,
   wherein the optical film in conjunction with the standard single vision spectacle lens, when tested on a bench-top, or a physical, model eye; wherein the retina of the bench-top, or physical, model eye comprising a camera with, a charge coupled device, or a complementary metal oxide sensor, is configured to capture images of a visual scene projected through the model eye corrected with the optical film; wherein the images captured by the retina of the model eye serves as an input stream for the virtual retinal simulator comprising at least one of the three image processing steps disclosed herein: (a) spatiotemporal filtering of the input stream of images resulting in a band-pass current, (b) an instantaneous non-linear contrast gain control using variable feedback gate shunt conductance, and (c) a discrete set of noisy integrate-and-fire cell models, resulting in spike trains depicting overall retinal ganglion cell activity; wherein the plurality of non-refractive opaque features are configured to provide the active rise in overall retinal ganglion cell activity compared to that obtained with a single vison spectacle lens that is devoid of the optical film; wherein the overall retinal ganglion cell activity, gauged as mean retinal spike rate integrated over a certain time frame, is at least 1.25 times of the overall retinal ganglion cell activity of a single vison spectacle lens that is devoid of the optical film; wherein the certain time frame over which the mean retinal spike rate is integrated is at least 2 seconds.

2. The optical film of claim 1, wherein the plurality of non-refractive opaque features forms one or more non-refractive opaque patterns;
   wherein the one or more of non-refractive opaque patterns includes at least: a square grid pattern, a spoke wheel pattern, a spiral pattern, a swirl pattern, a Memphis pattern, a dot-like pattern, a regular pattern, an irregular pattern, a moiré fringe pattern, an interference pattern, or a random pattern.

3. The optical film of claim 2, wherein the one or more non-refractive opaque patterns are configured such that the patterns are decentred with respect to the geometric centre of the spectacle lens.

4. The optical film of claim 1, wherein the plurality of non-refractive opaque features form a plurality of apertures, wherein each aperture circumscribes a substantially transparent region; wherein the shape of at least one of the plurality of apertures is circular, elliptical, oval, triangular, rectangular, square, pentagonal, or hexagonal, or octagonal, or any other regular polygon, or an irregular polygon, or a random shape; wherein the plurality of apertures are configured in a circular, hexagonal, radial, spiral, regular, irregular, or random arrangement; wherein the total number of apertures in the plurality of apertures is at least 6; and wherein the surface area of the circumscribed transparent region of at least one of the plurality of apertures is between 0.25 square mm and 7.5 square mm.

5. The optical film of claim 4, wherein the plurality of apertures are configured to be separated, adjoined, or conjoined.

6. The optical film of claim 1, wherein a surface area of the optical film is at least 1200 square millimetres; wherein the plurality of non-refractive opaque features is configured within the central 60% of the optical film applied to the standard single vison spectacle lens; and wherein the remainder of the optical film is devoid of the plurality of non-refractive opaque features.

7. The optical film of claim 1, wherein a surface area of the optical film is at least 1200 square millimetres; wherein the plurality of non-refractive opaque features is configured within the peripheral 40% of the optical film applied to the standard single vison spectacle lens and wherein the remainder of the optical film is devoid of the plurality of non-refractive opaque features.

8. The optical film of claim 1, wherein each of the non-refractive opaque feature is configured such that it absorbs at least 80 percent of the light incident on the opaque feature.

9. The optical film of claim 1, wherein the width of each of the non-refractive opaque feature is between 25 μm to 300 μm such that the non-refractive opaque feature remains substantially non-diffractive.

10. The optical film of claim 1, wherein the non-refractive opaque features are applied using pad-printing, laser etching, photo-etching, tinting, or laser printing.

11. The optical film of claim 1, wherein the optical film is configured permanently or impermanently.

12. A method of use of the impermanent optical film of claim 11, wherein the set of instructions of applying the impermanent optical film includes at least the following options (i) gluing onto the spectacle lens, (ii) made to adhere with finger pressure to the spectacle lens, (iii) using as a sticker on one of the surfaces of the spectacle lens, (iv) using as a peel-able adhesive on one of the surfaces of the spectacle lens, or a combination thereof.

13. The optical film of claim 1, wherein the optical film in conjunction with the standard single vision spectacle lens, when tested on a model eye configured with a distance refractive error substantially matching the base prescription, provides an on-axis, and an off-axis wide-field, modulation transfer function, for at least one pupil diameter, and at least one wavelength between 420 nm to 760 nm inclusive, which is substantially equivalent to that obtained with a standard single vison spectacle lens that is devoid of the optical film; wherein the off-axis wide-field includes at least 5° of the visual field; and wherein the model eye is a schematic, a physical, or a bench-top model eye.

14. The optical film of claim 1, wherein the optical film in conjunction with the standard single vision spectacle lens, when tested on a model eye configured with a distance refractive error substantially matching the base prescription, results in spatial and temporal variations to artificial edges, or spatial luminous contrast profiles, spread across the off-axis wide-field of the model eye; wherein non-refractive opaque features provide the spatial variations, and the temporal variations emulate eye movements.

15. The optical film of claim 1, wherein the overall retinal ganglion cell activity, or non-stationarity in neural response, gauged as mean retinal spike rate, is observed in on-centre/off-surround retinal field, or on-surround/off-centre retinal field, or both; wherein the function describing the overall retinal ganglion cell activity of the model eye, or non-stationarity in neural response, gauged in terms of mean retinal spike rate as a function of time, follows a non-linear, or aperiodic, or a sinusoidal, or quasi-sinusoidal, rectangular-wave, quasi rectangular-wave, square-wave, quasi square-wave, or a non-monotonic, pattern depicting a temporal variation in the overall retinal ganglion cell activity.

16. The optical film of claim 15, wherein the optical film at least in part, a time-varying and spatially variant stop signal to reduce the rate of myopia progression.

17. The optical film of claim 16, wherein the effect of at least one of slowing, retarding, or preventing myopia progression is maintained across at least 12 months of lens wear.

18. The optical film of claim 1, wherein the optical film is applied at least on the front surface of the spectacle lens, the back surface of the spectacle lens, or within the spectacle lens.

* * * * *